(12) United States Patent
Kashanian

(10) Patent No.: US 9,124,436 B2
(45) Date of Patent: Sep. 1, 2015

(54) INTELLIGENT AUTOMATED DATA USAGE UPGRADE RECOMMENDATION

(75) Inventor: Nematolah Kashanian, Hackensack, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 891 days.

(21) Appl. No.: 12/970,377

(22) Filed: Dec. 16, 2010

(65) Prior Publication Data

US 2012/0155296 A1   Jun. 21, 2012

(51) Int. Cl.
   *H04L 12/26* (2006.01)
   *H04L 12/14* (2006.01)
   *H04M 15/00* (2006.01)
   *H04W 4/24* (2009.01)

(52) U.S. Cl.
   CPC ........ *H04L 12/1492* (2013.01); *H04L 12/1417* (2013.01); *H04L 12/1435* (2013.01); *H04M 15/58* (2013.01); *H04M 15/80* (2013.01); *H04M 15/8044* (2013.01); *H04M 15/83* (2013.01); *H04M 15/84* (2013.01); *H04M 15/85* (2013.01); *H04M 15/853* (2013.01); *H04M 15/854* (2013.01); *H04W 4/24* (2013.01)

(58) Field of Classification Search
   None
   See application file for complete search history.

(56) References Cited

U.S. PATENT DOCUMENTS

| | | | |
|---|---|---|---|
| 6,373,929 | B1 | 4/2002 | Johnson et al. |
| 6,400,903 | B1 | 6/2002 | Conoval |
| 6,556,241 | B1 | 4/2003 | Yoshimura et al. |
| 6,947,723 | B1 | 9/2005 | Gurnani et al. |
| 6,973,038 | B1 | 12/2005 | Narendran |
| 7,043,225 | B1 | 5/2006 | Patel et al. |
| 7,068,306 | B2 | 6/2006 | Pyle et al. |
| 7,206,569 | B2 | 4/2007 | Erskine et al. |
| 7,280,818 | B2 | 10/2007 | Clayton |
| 7,400,891 | B2 | 7/2008 | Aaron |
| 7,528,863 | B2 | 5/2009 | Koshikawa |
| 7,818,438 | B2 | 10/2010 | Hachimura |
| 8,112,062 | B2 | 2/2012 | Pattabiraman |
| 8,140,364 | B2 | 3/2012 | Kannan et al. |
| 8,194,581 | B1 | 6/2012 | Schroeder et al. |
| 8,224,983 | B2 | 7/2012 | Ta et al. |
| 8,281,016 | B2 | 10/2012 | Nomura et al. |
| 8,347,362 | B2 | 1/2013 | Cai et al. |
| 8,400,925 | B2 | 3/2013 | Wurm et al. |

(Continued)

FOREIGN PATENT DOCUMENTS

| | | |
|---|---|---|
| WO | WO-2005/081735 | 9/2005 |
| WO | WO-2008/019334 | 2/2008 |

OTHER PUBLICATIONS

U.S. Appl. No. 12/264,492, filed Nov. 4, 2008.

*Primary Examiner* — Minh-Trang Nguyen

(57) ABSTRACT

A method of notifying a mobile station regarding data usage with a plan limit includes tracking an amount of data usage consumed by the mobile station. A first data usage limit and a first data usage time frame are determined from a user account. A comparison is made of the data usage to the first data usage limit and a present time to the first data usage time frame. From this comparison, a projected data usage amount is determined and whether the projected data usage exceeds the first data usage limit. If exceeded, the system analyzes a second data usage limit to determine if it is greater than the projected data usage amount. If greater, the server provides a message to the mobile station notifying the user of the projected overage and suggestions to change to a new plan offering the second data usage limit.

19 Claims, 10 Drawing Sheets

(56) References Cited

U.S. PATENT DOCUMENTS

| | | |
|---|---|---|
| 2002/0075844 A1 | 6/2002 | Hagen |
| 2002/0138398 A1 | 9/2002 | Kalin et al. |
| 2002/0141420 A1 | 10/2002 | Sugiarto |
| 2003/0071902 A1 | 4/2003 | Allen et al. |
| 2004/0106393 A1 | 6/2004 | Chowdhury et al. |
| 2004/0137874 A1 | 7/2004 | Veerepalli et al. |
| 2005/0111036 A1 | 5/2005 | Takasaki et al. |
| 2005/0282559 A1 | 12/2005 | Erskine et al. |
| 2006/0045245 A1 | 3/2006 | Aaron et al. |
| 2006/0259629 A1 | 11/2006 | Usmani et al. |
| 2006/0287921 A1 | 12/2006 | Defries |
| 2007/0002129 A1 | 1/2007 | Benco et al. |
| 2007/0019670 A1 | 1/2007 | Falardeau |
| 2007/0230910 A1 | 10/2007 | Welch et al. |
| 2007/0271513 A1 | 11/2007 | Andren |
| 2007/0298787 A1 | 12/2007 | Matharu |
| 2008/0159212 A1* | 7/2008 | Zhang et al. .................. 370/329 |
| 2008/0201225 A1 | 8/2008 | Maharajh et al. |
| 2008/0207216 A1 | 8/2008 | Usuda et al. |
| 2009/0068980 A1* | 3/2009 | Creswell et al. ............. 455/405 |
| 2009/0153686 A1 | 6/2009 | Huang |
| 2009/0172796 A1 | 7/2009 | Wood et al. |
| 2009/0182599 A1 | 7/2009 | Kannan et al. |
| 2009/0182859 A1 | 7/2009 | Motoyama |
| 2010/0008337 A1 | 1/2010 | Bajko |
| 2010/0017506 A1 | 1/2010 | Fadell |
| 2010/0056130 A1 | 3/2010 | Louch et al. |
| 2010/0182438 A1 | 7/2010 | Mohammed |
| 2010/0188975 A1 | 7/2010 | Raleigh |
| 2010/0188990 A1 | 7/2010 | Raleigh |
| 2010/0188991 A1 | 7/2010 | Raleigh |
| 2010/0188992 A1 | 7/2010 | Raleigh |
| 2010/0188993 A1 | 7/2010 | Raleigh |
| 2010/0188994 A1 | 7/2010 | Raleigh |
| 2010/0188995 A1 | 7/2010 | Raleigh |
| 2010/0190470 A1 | 7/2010 | Raleigh |
| 2010/0191575 A1 | 7/2010 | Raleigh |
| 2010/0191576 A1 | 7/2010 | Raleigh |
| 2010/0191604 A1 | 7/2010 | Raleigh |
| 2010/0191612 A1 | 7/2010 | Raleigh |
| 2010/0191613 A1 | 7/2010 | Raleigh |
| 2010/0191846 A1 | 7/2010 | Raleigh |
| 2010/0191847 A1 | 7/2010 | Raleigh |
| 2010/0192120 A1 | 7/2010 | Raleigh |
| 2010/0192170 A1 | 7/2010 | Raleigh |
| 2010/0192207 A1 | 7/2010 | Raleigh |
| 2010/0192212 A1 | 7/2010 | Raleigh |
| 2010/0195503 A1 | 8/2010 | Raleigh |
| 2010/0197266 A1 | 8/2010 | Raleigh |
| 2010/0197267 A1 | 8/2010 | Raleigh |
| 2010/0197268 A1 | 8/2010 | Raleigh |
| 2010/0198698 A1 | 8/2010 | Raleigh |
| 2010/0198939 A1 | 8/2010 | Raleigh |
| 2010/0199325 A1 | 8/2010 | Raleigh |
| 2010/0205301 A1 | 8/2010 | Ansari et al. |
| 2010/0229248 A1 | 9/2010 | Glave |
| 2011/0019566 A1* | 1/2011 | Leemet et al. ................ 370/252 |
| 2011/0058052 A1 | 3/2011 | Bolton et al. |
| 2011/0078767 A1 | 3/2011 | Cai et al. |
| 2011/0115932 A1 | 5/2011 | Shin et al. |
| 2011/0125609 A1 | 5/2011 | Burger et al. |
| 2012/0215911 A1 | 8/2012 | Raleigh et al. |
| 2012/0330792 A1 | 12/2012 | Kashanian |

\* cited by examiner

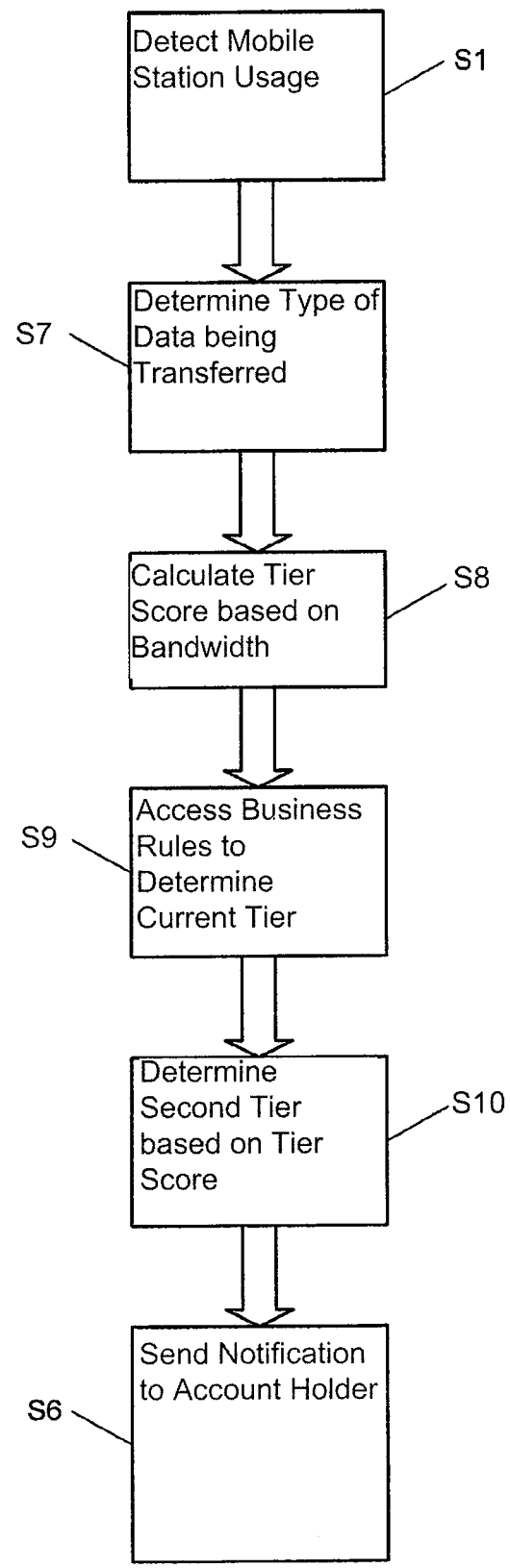
*FIG. 4*B

INTELLIGENT AUTOMATED DATA USAGE UPGRADE RECOMMENDATION

TECHNICAL FIELD

The present subject matter relates to techniques and equipment to provide reliable notification to the holder of a mobile communication subscription account, upon a determination that a mobile station may be exceeding the limitations on the holder's current subscription plan and suggest an alternate subscription plan.

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or e-mail communications via the wireless communication networks. As the public wireless communication networks have evolved to provide greater bandwidth and packet based services, the industry has developed a variety of data services, such as web browsing, as well as a variety of services using multimedia message service (MMS) technology.

Wireless packet data communication is being provided with ever increasing transmission speed. The packet data communication allows mobile station users to expand the scope of their use of the mobile station: for example, to enjoy multimedia services at a speed comparable to those enjoyed via Internet connected personal computers (PCs).

As the packet data communication has become prevalent, multiple forms of payment for networked data communication services have evolved. Multiple account options with varying amounts of data usage, call time, and bandwidth allowable are available as postpaid, and prepaid communications services. Prepaid data service, in which a customer or subscriber has fixed availability of usage of a resource, is becoming as popular as postpaid options. Such accounts now encompass a vast majority of mobile wireless communications. Using the example of a prepaid wireless service, the customer may purchase discrete blocks of time or amounts of data for making voice telephone calls or data communication via a cellular telephone network; or, the customer may alternatively use a postpaid model in which a fixed fee will be applied for using a certain amount of a resource within a certain time cycle (e.g., within a month) and which, if used up, may entail a further fee for use of further resources.

Upon connecting to the wireless communications network, the customer account is authorized and authenticated, and the network allows a voice or data call to proceed. The network monitors the customer's usage time or data and decrements from the customer's account. If the account becomes depleted or reaches the billing cycle limits, the system can either prompt the customer to purchase more time or data, or the system can terminate the call. In a postpaid plan, typically the system does not provide any notification that the customer's usage has gone over account limits. Typically, a premium charge is associated with the overage and the premium charge is added to the next pay cycle's bill.

Another prepaid and postpaid plan option, however, enables the customer to budget an amount of airtime that will be used during a certain period of time, and insures that the budget will not be exceeded unless the customer desires more airtime. A similar plan may be offered for data communications, e.g. with a set limit on the amount of data. The wireless service provider likes this type of service, because the carrier receives payment in advance and need not run the risk that the customer will default on a bill, and also brings great value in terms of revenue to the service provider even with fixed resource options. Since data communication may be terminated without notice, or price for usage of data communication may increase when the prepaid or postpaid account depletes, the customers want to be notified in advance of reaching the data plan limit.

In another aspect, since most recent packet data communication users are young users, parents of the young users would like to keep track of and control usage of packet data communications of their children. As a way to control usage of data communication by their children, the parents need to be notified in advance of reaching the data plan limit or a pre-set usage limit.

To address these needs for people to receive notifications of reaching a data plan limit or a pre-set usage limit, some wireless communication service providers provide notifications of reaching the data plan limit to the customers. The wireless communication service providers, however, do not provide advance notice of reaching a data plan limit since the amount of use of data plan limit is checked only after the end of each data communication session or each billing cycle. In addition, the wireless communication service providers take an initiative in sending the notification upon reaching the limit, but the customer is unaware of other account options that could minimize the customer's cost for the over-the-limit data usage (also known as "overage").

Further, the FCC announced in October, 2010 that they are beginning the process to force service providers to let customers know when monthly minutes for phone services are about to be exceeded before the monthly billing cycle is complete and the customer's bill is sent.

Hence, a need exists for a method and a system for providing the mobile station customer with real time advance notice of reaching a data plan threshold and at the same time providing other data plan options to minimize the customer's overage costs.

Another need exists for a method and a system for providing advance notice of reaching a data plan threshold to a mobile station customer which allows the customer to change the account limitations at which the notification is sent to the customer.

SUMMARY

The teachings herein address one or more of the above noted needs relating to sending advance notice to a mobile station user of the level of usage versus the data amount limit set under her or his data plan.

An aspect of the disclosure encompasses a method for notifying a mobile station user prior to reaching of at least one threshold level of data usage via a wireless communication network. An account of the mobile station user has a maximum data plan limit defined by a user's plan and a data usage balance reflecting an amount of data usage remaining under the plan.

As a result of and triggered by one or more data sessions of the user's mobile station, requests for data usage from the data usage balance under the user's plan is received from a node of a mobile wireless communication network and data communication of the user's mobile station are routed through and monitored through the node. In response to each request, it is determined if projected data usage corresponding to the request crosses the threshold level of data usage.

For a request where the data usage does not cross the threshold level of data usage, no notice is sent to the mobile station. For a request where the projected data usage crosses the threshold level of data usage, a notification is sent to the user's mobile station during the respective data session and an option to change billing plans is provided. The notification of projected usage reaching the threshold is sent to the mobile station in real time to allow the user to select an appropriate new billing plan, e.g. before actual usage exceeds the limit in a manner that might otherwise incur additional charges.

The threshold may be set by the mobile station user or the service provider. The threshold may include multiple thresholds, and multiple notifications of reaching the multiple thresholds may be sent to the mobile station in real time, at the time when the data usage has reached the multiple thresholds. The thresholds can also be across different aspects of the user's plan, for example, voice call minutes, data volume downloaded to the mobile station, and the bandwidth at which the mobile station can upload and download data.

The notification can be in a form of a Short Message Service (SMS) message, a Multimedia Messaging Service (MMS) message, or a voice message. Notification can also be based on a hypertext transfer protocol (HTTP) push (a.k.a. HTTP streaming) where a web server pushes the notification to a mobile device. The notification is sent at the time when the data usage reaches the threshold level of data without a time gap between the time at which the threshold is reached and the time of sending the notification.

The data usage can be counted by a Packet Data Serving Node (PDSN) to route traffic flowed between the mobile station and the mobile wireless communication network. The threshold is less than the maximum data plan limit.

Thus, a method of notifying the mobile station regarding data usage, can include the steps of tracking an amount of data usage being used by the mobile station. This tracking can occur at the mobile station, the server communicating with the mobile station, or both. It can then be determined, from the user account for the mobile station a first data usage limit and a first data usage time frame. The user account information can typically be stored on the server. The server, or the mobile station, can then compare the amount of data usage to the first data usage limit and compare a present time to the first data usage time frame. From this comparison, a projected data usage amount for the first data time frame can be determined and if the projected data usage amount exceeds the first data usage limit. Upon determining that the projected data usage amount exceeds the first data usage limit in the first data usage time frame, then the system analyzes at least a second data usage limit to determine if it is greater than the projected data usage amount. Additionally, or alternately, if second data usage limit is greater than the projected data usage amount, the server provides a message to the mobile station with a suggestion to change to a subscription plan offering the second data usage limit.

The example further includes tracking a first data type to determine an amount of the first data type and determining, from the account, a first bandwidth limit. A projected operational bandwidth can be calculated based on the amount of the first data type and the amount of data usage. The projected operational bandwidth can be compared to the first bandwidth limit and if the projected operational bandwidth is greater than the first bandwidth limit, analyzing at least a second bandwidth limit. The second bandwidth limit can be analyzed to determine if it is greater than the projected operational bandwidth, and if so, provide a message to the mobile station with a suggestion to change to a subscription plan offering the second bandwidth limit. The message can include the result of the determining calculated above.

In another example, if the projected operational bandwidth is less than the first bandwidth limit, then analyze at least a third bandwidth limit to determine if it is greater than the projected operational bandwidth and less than the first bandwidth limit. If the third bandwidth limit is greater than the projected operational bandwidth and less than the first bandwidth limit, provide a message to the mobile station with a suggestion to change to a subscription plan offering the third bandwidth limit.

Further, at least one of the data usage and the projected data usage amount can be altered by a threshold amount before determining if the projected data usage amount exceeds the first data usage. Thus, actual usage can be modified to provide "wiggle room" before a notification is send out.

Additionally, in all of the above examples the mobile station can maintain an ability to operate uninterrupted in a communication network. Thus, this notification system is unlike pre-pay systems which send notifications and then terminate service once the maximum limit is reached. In one example, the user is a post-pay subscriber and has the option to pay the overage fees, the service provider does not interrupt the subscriber's service. Further, an option can be provided to allow the user to suspend their service, or the service of individual mobile stations, until the next billing cycle rolls around so the account does not enter into overages.

In a further example of a method of sending a notification to a mobile station in a communication network regarding a projected data amount overage, a usage data aggregator can detect real-time mobile station data usage and a present time. The usage data aggregator can access the account data for the mobile station and determine a usage data limit and an account cycle. The account data can be stored in the usage data aggregator or in a separate server. A calculation is performed, based on the real-time mobile station data usage, the usage data limit, the present time and the account cycle, to determine a current usage amount and a time remaining in the cycle. The current usage amount and the time remaining are compared to see if the current data usage amount exceeds the time remaining. Upon determining that the current data usage amount exceeds the time remaining, another analysis is performed. At least a second account data having a second usage data limit is analyzed to determine if the second data usage limit is greater than the usage limit and less than the current usage amount. Based on the analysis, a notification message is provided to the mobile station with a suggestion to change to a subscription plan offering the second account data.

As yet another example, an article of manufacture includes at least one machine readable storage medium and programming instructions embodied in the one medium for execution by one or more computers. The programming configures the one or more computers to be capable of performing functions for communicating a threshold notification and account suggestion over a network to a mobile station. The functions of the programming include tracking an amount of data usage to the mobile station. This tracking can be done by at least one of the mobile station and a server communicating with the mobile station. A determination is made, from an account for the mobile station stored on the server, of a first data usage limit and a first data usage time frame. The server compares the amount of data usage to the first data usage limit and compares a present time to the first data usage time frame. Based on the comparison a projected data usage amount is determined, and if the projected data usage amount exceeds the first data usage limit. If the projected data usage amount exceeds the first data usage limit in the first data usage time frame, an analysis is performed. At least a second data usage limit is analyzed to determine if it is less than the projected data usage amount. If second data usage limit is less than the projected data usage amount, providing a message to the mobile station with a suggestion to change to the second data usage limit.

The programming can further include the functioning of tracking a first data type to determine an amount of the first data type. Then determining, from the account, a first bandwidth limit. Based on the amount of the first data type and the amount of data usage a projected operational bandwidth can be calculated. The projected operational bandwidth is compared to the first bandwidth limit. If the projected operational bandwidth is greater than the first bandwidth limit, analyze at least a second bandwidth limit. This analysis determines if the second bandwidth limit is greater than the projected operational bandwidth. If so, provide a notification message to the mobile station with a suggestion to change to a subscription plan offering the second bandwidth limit.

The article can also provide the results of the calculations in the message. Further, the article can, if the projected operational bandwidth is less than the first bandwidth limit, include additional programming functions. These functions can include analyzing at least a third bandwidth limit to determine if it is greater than the projected operational bandwidth and less than the first bandwidth limit. If the third bandwidth limit is greater than the projected operational bandwidth and less than the first bandwidth limit, then the programming provides a notification message to the mobile station with a suggestion to change to a subscription plan offering the third bandwidth limit.

The programming in the article can also alter at least one of the data usage and the projected data usage amount by a threshold amount before determining if the projected data usage amount exceeds the first data usage. As noted above, the article can also make sure that the mobile station maintains an ability to operate uninterrupted in a communication network.

Another aspect of the disclosure encompasses a processor-readable medium tangibly embodying a set of processor-executable instructions. Execution of the instructions causes a processor to perform operations for notifying a mobile station user of reaching a projected data usage threshold level of data usage via a wireless communication network in one of the ways outlined above. Mobile station user has a maximum data plan limit defined by a user's plan and a data usage balance reflecting an amount of data usage remaining under the plan.

As a result, the mobile station user can not only be notified of the pending overage, but a suggestion can be provided for the next available subscription plan to allow the user to consume the projected data amount and not have to pay overage fees.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4A is a high-level flow chart illustrating a process for sending one or more notifications upon occurrence of exceeding a data usage threshold or the like.

FIG. 4B is a high-level flow chart illustrating a process for sending one or more notifications for intelligent upgrading or the like.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to technologies for providing reliable advance notice upon determination that operation of a mobile station through a mobile communication network has resulted in projected data usage on the mobile station subscriber's account approaching or reaching its account limits (i.e., the account is projected to enter overage with regards to data usage) and then providing account options. The usage analysis includes data volume. However, the usage analysis may also take into account other factors such as bandwidth and/or data types.

Figure 1:
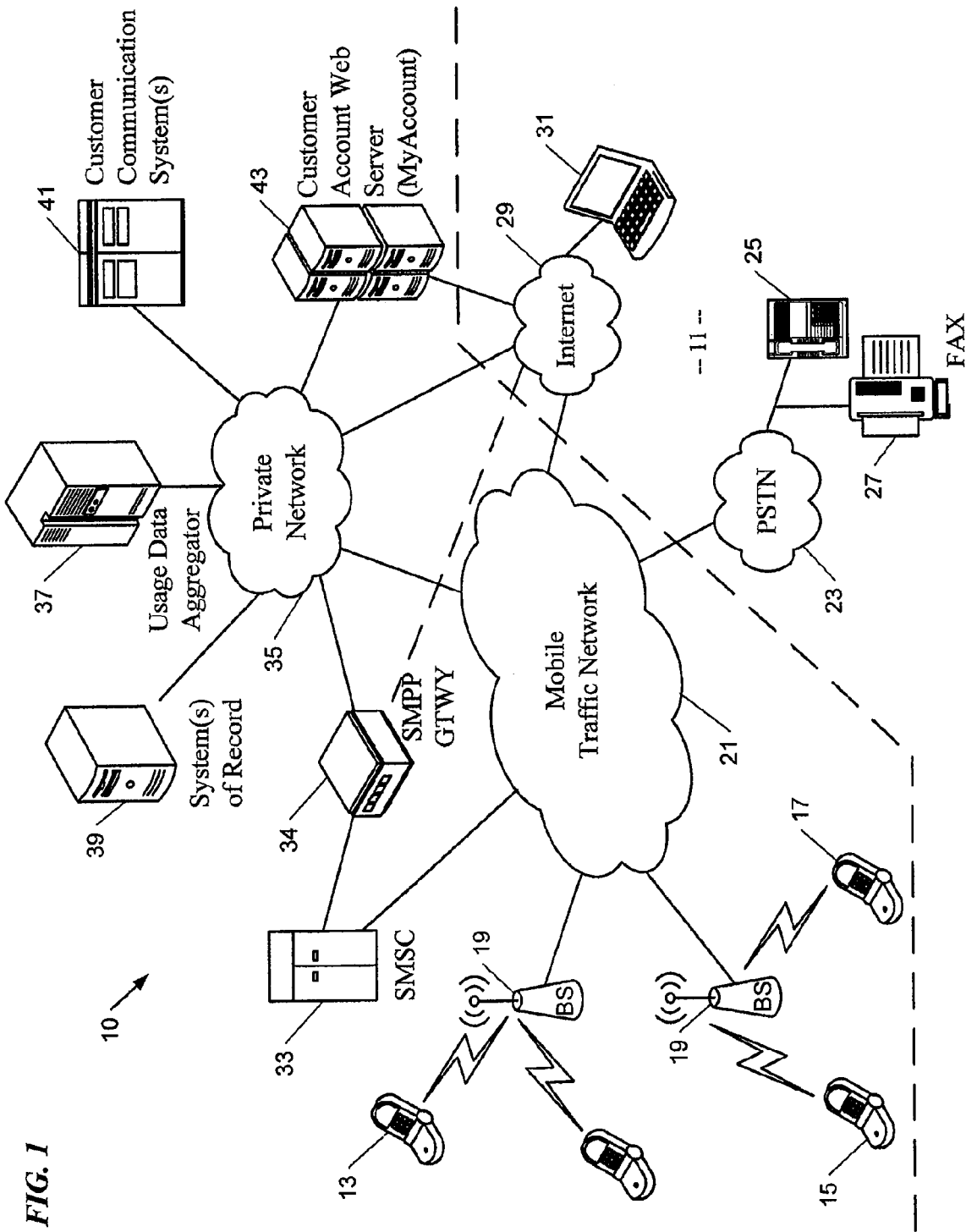
FIG. 1 is a functional block diagram useful in understanding networked elements/systems that may be used in providing mobile service subscribers various notifications, upon determination that a mobile station usage is exceeding its account limits.

Reference now is made in detail to the examples illustrated in the accompanying drawings and discussed below. FIG. 1 illustrates a number of mobile stations, a mobile communication network coupled to other communication networks and several systems/elements associated with or included in the mobile network for various functions as may be involved in monitoring mobile station data usage, determining projections of usage with respect to plan limits and providing attendant notifications.

Hence, FIG. 1 illustrates a mobile communication network 10 as may be operated by a carrier or service provider to provide a wide range of mobile communication services and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations 11 outside the mobile communication network 10.

For purposes of later discussion, several mobile stations appear in the drawing, to represent examples of the mobile stations that may receive various services via the mobile communication network 10. Today, mobile stations typically take the form portable handsets, smart-phones or personal digital assistants, although they may be implemented in other form factors, including consumer and business electronic devices. The mobile stations 13, 15, 17 for example, may take the form of a mobile telephone station, enhanced with display and user input capabilities to support certain text and image communications, such as email, picture communication and web browsing applications.

Figure 7:
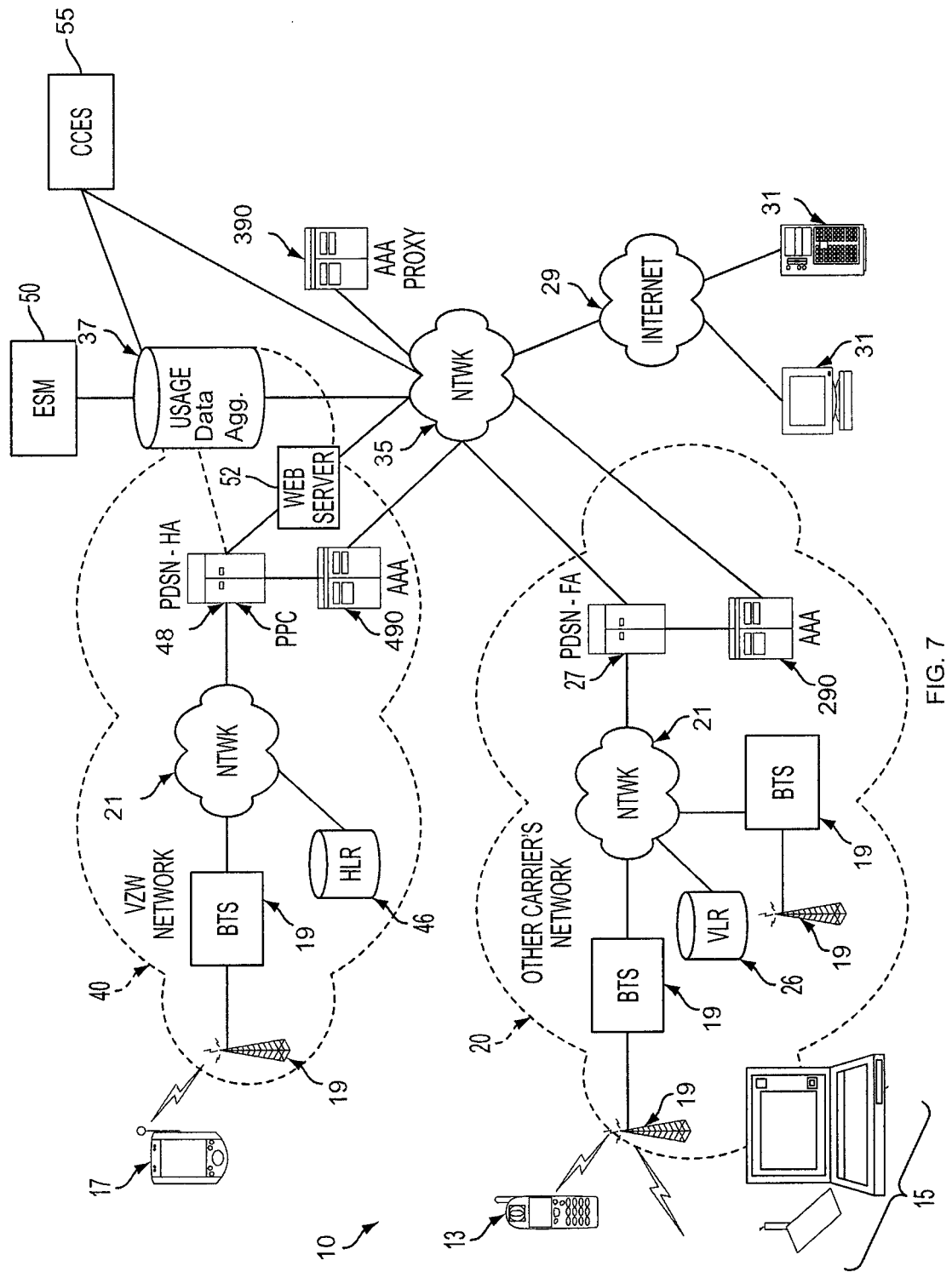
FIG. 7 is a network diagram of another example of hardware as may be used for sending multiple threshold notifications in real time to a mobile station.

In another example, as illustrated in FIG. 7, mobile station 15 is a portable computing device, specifically, comprising a wireless modem card inserted into a handheld or laptop personal computer (PC) or the like. Although shown as a separate card, the modem may be integrated into the PC. Alternatively, the PC may connect to a handset device, similar to the handset type mobile station 13. The station 17 can take the form of a personal digital assistant (PDA) or BlackBerry type device incorporating a wireless transceiver compatible with the particular type of packet data service offered by the system 10. For discussion of one usage notification example and the associated exemplary notification service, we assume that the mobile stations 13, 15, 17 are all covered under one subscriber account, and that among those stations, the mobile station 13 is the station of the account holder (AH).

The network 10 allows users of the mobile stations to initiate and receive telephone calls to each other as well as through the public switched telephone network (PSTN) and telephone stations connected thereto. The network 10 allows SMS type text messaging between mobile stations and similar messaging with other devices via the Internet. The network 10 typically offers a variety of other data services via the Internet, such as downloads, web browsing, e-mail, etc.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements, such as the MMSCs. A regional portion of the network 10, such as that serving mobile stations 13, 15, 17, will typically include one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown in FIG. 1, but shown in FIG. 7, such a base station 19 typically comprises a base transceiver system (BTS) which communicates via an antennae system at the site of base station and over the airlink with one or more of the mobile stations 13, 15 and 17, when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13, 15, 17 between the base stations and other elements with or through which the mobile stations communicate. Individual elements such as switches and/or routers forming the traffic network 21 are omitted here form simplicity.

The traffic network portion 21 of the mobile communication network 10 connects to a public switched telephone network 23. This allows the network 10 to provide voice grade call connections between mobile stations and regular telephones connected to the PSTN 23. The drawing shows one such telephone at 25. For purposes of discussing notifications, some notifications may entail voice message delivery or even service representative calls to the account holder, for example, at a regular telephone such as telephone 25 via the PSTN 23. The PSTN 23 also provides connections to other types of customer premises equipment, such as facsimile or 'FAX' machines. The drawing shows one FAX machine 27, by way of example, to illustrate the point that an account holder notification may entail a facsimile transmission of the notification message to the account holder's FAX machine, such as the machine 27.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile station communications of text and multimedia messages, e-mail, web surfing or browsing, programming and media downloading (including audio and video), etc. For example, the mobile stations may be able to receive messages from and send messages to user terminal devices, such as personal computers, either directly (peer-to-peer) or via various servers (not separately shown). The drawing shows one such user terminal device as a personal computer (PC) 31 or servers 31, by way of example. For purposes of discussing notifications, some notifications may entail an e-mail message transmission of the notification to the account holder's terminal, such as to the PC 31 via the Internet 29.

Wireless carriers developed the short message service (SMS) to transmit text messages for display on the mobile stations. In many existing network architectures, the SMS traffic uses the signaling portion of the network 21 to carry message traffic between a Short Message Service Center (SMSC) 33 and the mobile stations. The SMSC supports mobile station to mobile station delivery of text messages. However, the SMSC also supports communication of messages between the mobile stations and devices coupled to other networks. For example, the SMSC 33 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 34. The SMPP gateway provides protocol conversions, between SMPP as used by the SMSC 33 and the protocols used on the Internet 29 or other IP network. SMPP messages ride on IP transport, e.g. between the gateway 34 and the SMSC 33.

Of note for purposes of this discussion, many of the notifications discussed herein are sent to various mobile stations using either the SMS capabilities of the network 10 or a proprietary client which is resident on the mobile station. For example, when a mobile station 13, 15, or 17 has reached a balance wherein an account overage is likely, then the network 10 provides a notification in the form of an SMS message sent via the SMPP gateway 34, the SMSC 33, the traffic network 21, one of the base stations 19 and a signaling channel over the air link to the mobile station 13 of the account holder. In some cases, the network 10 may also send an SMS message to the mobile station of the other users on the account. Hence, in our example, when any mobile station 13, 15, or 17 approaches the account limits, the network 10 might also provide a notification in the form of an SMS message sent via the SMPP gateway 34, the SMSC 33, the traffic network 21, one of the base stations 19 and a signaling channel over the air link to the remaining mobile stations 13, 15, or 17.

The carrier will also operate a number of systems that provide ancillary functions in support of the communications services provided through the network 10, and those elements communicate with other nodes/elements of the network 10 via one or more private IP type packet data networks 35 (sometimes referred to as an Intranet). The support elements, for example, include one or more systems of record, such as the system shown at 39. An example of such a system 39 is a Vision system, which includes subscriber account records. A large carrier typically has a number of such systems, and the system that stores the account data for a particular subscriber may be referred to as the "system of record" for that subscriber's account.

Some of the users of the mobile stations will subscribe to voice and/or data services under one or more postpay service plans offered by a carrier or service provider. However, the users or subscribers of other stations will subscribe to voice and/or data services under a plan, in which they pay in advance for an amount of communication service usage. In the examples, usage is measured by duration, e.g. length of time of a circuit switched voice call or length of time of a data communication session or volume of the consumed data.

As discussed more later, with regard to FIG. 2, the customer communications system 41 also includes or has access to a preference center system 53 that forms a system of record, which includes a record for the mobile stations 13, 15 and 17. That record identifies the mobile stations 13, 15, 17, and the account holder (AH) for notification purposes. The AH designated may be the main subscriber number under which the account was originally established, but the subscriber may change the AH designation to another of the numbers under the account.

For purposes of account usage tracking, another ancillary carrier system of the network 10 is a usage data aggregator 37. The usage data aggregator 37 monitors real time usage of the mobile stations 13, 15, and 17 through the mobile traffic network 21. Trigger events with regard to usage by the mobile stations 13, 15, and 17 also are defined in the data aggregator 37. If there is an event corresponding to a trigger defined by projected usage, the usage data aggregator 37 will detect that event and generate an infraction notification request message for transmission via the network 35.

The aggregator 37 may be similar to real-time call or usage rating platform developed for prepaid services. Such a platform, however, may be adapted to usage monitoring for postpay subscription services as well, for example, where it is desirable to monitor the amount of usage or other aspect of mobile station operations in real-time. An example of a suitable platform, which may be adapted to perform the functions of the usage data aggregator 37, is the Surepay® platform manufactured and sold by Alcatel-Lucent.

The exemplary network 10 also includes a customer communications system 41, which is coupled for communication via the private network 35. The customer communications system 41 receives the notification request message from the usage data aggregator 37, and in response, generates and sends one or more notification messages. For example, the customer communications system 41 may generate and send SMS messages, one to the mobile station 13 designated as that of the account holder and/or an SMS message to the mobile other stations 15, 17 that are on the account. In the examples discussed in more detail below, the customer communications system 41 also supports alternative messaging, for example, in the form of facsimile, voice or e-mail messages. The customer communications system 41 may utilize those alternative message communication capabilities for projected usage notifications or for other types of notification communications that the carrier may offer to its subscribers, e.g. to provide notifications of significant account activities such as on-line access to add a number/station or to change the primary password on the account.

In practice today, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 43, offering a 'MyAccount' (Now MyVerizon) type subscriber interface via the Internet. Hence, a user's terminal, such as PC 31, may be used to access on-line information about a subscriber's account, which the mobile carrier makes available via the carrier's MyAccount web site accessible through the Internet 29.

Figure 3:
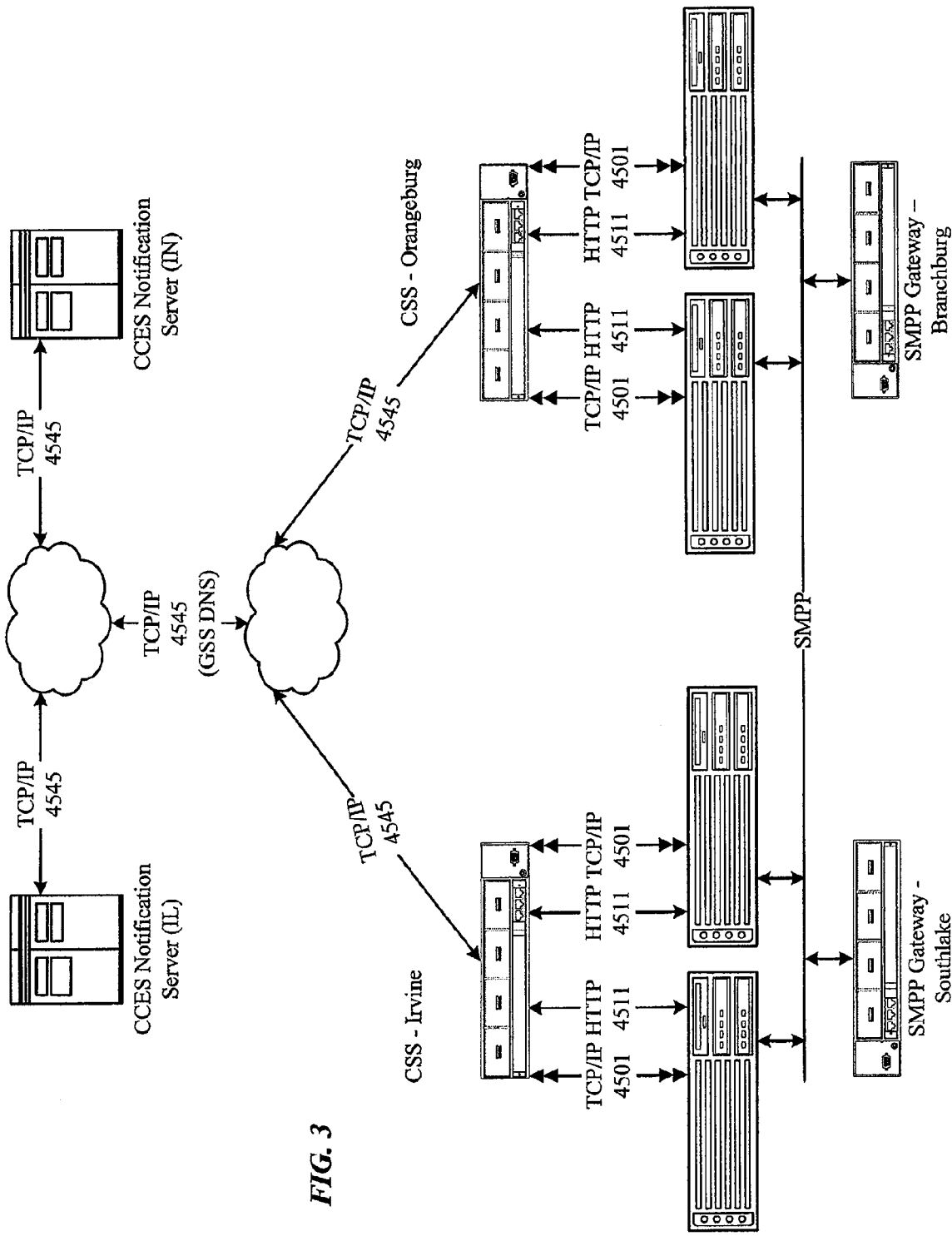
FIG. 3 is a network diagram of an example of hardware as may be used for usage threshold related notifications.

The customer communication system 41 could be implemented on a single hardware platform. However, to provide effective notification services for a large number of customers and a large volume of trigger events, the customer communication system 41 for the usage control associated example of infraction notification service and other enterprise applications requiring notification may utilize a distributed system architecture. Hence, FIG. 3 is a network diagram of an exemplary hardware platform for the CCES notification service in support of the usage control service.

For example, the subscriber may use their mobile station 13, 15, 17 or the PC 31 to log-in via the site offered by the server 43 to subscribe to an account having particular usage limits. In an exemplary deployment, a number of options for different usage amounts are available, and the web site allows the subscriber to select the one she or he wants. As noted, the web site also allows the subscriber to select an AH designation, and we assume for discussion of further examples that the subscriber selects mobile station 13 as that of the account holder. The server 43 communicates with other network systems via the private network 35, for example, to store the subscription information and account holder designation in the systems of record 39 and 53. For example, when the customer subscribes to a usage account, the MyVerizon application in the server 43 sends an XML over HTTP request to the CCC request processor in customer communications system 41, to notify the subscriber of this account change in accord with the applicable business rules. As is known, other applications can be used in place of the MyVerizon application to enable access to user subscription account information.

However, this notification request per the business rules also causes the CCC request processor to set the account holder designation appropriately in the preference center 53. Appropriate triggers for the account limits can also be loaded into the usage data aggregator 37. If the system offers reporting options to the subscriber, such as options to select alternative notifications in the event that a SMS notification to the account holder fails, the applicable notification choices also may be stored as subscriber preferences in the preference center directory 53 maintained by the customer communication system 41.

With that overview of the system, it may be helpful now to consider a high-level discussion of an example of a projected usage with associated notifications, including how these services might appear from the user or subscriber's point of view.

In a current implementation, usage monitoring and notification with alternate account information can be a subscription feature or a standard feature that allows a subscriber to select one or more possible usage monitoring options offered for the feature include a voice call usage threshold, a voice call usage maximum limit, a message communication usage threshold, a message communication maximum limit, a data communication usage threshold, and a data communication maximum limit.

In operation, the subscriber uses their personal identification number and a password to log onto their own account page at the carrier's website, using a PC 31 or the mobile stations 13 and the web server 43. Once the customer has subscribed or is enrolled to the usage monitoring feature, the subscriber selects one or more mobile stations for notification purposes. Hence, web server 43 offers the subscriber a selection option, and the subscriber selects the appropriate mobile station 13, 15, 17 under the account for the holder, such as mobile station 13 in our example.

Once the subscriber has made the various selections for the usage monitoring service, relevant data is stored in the systems of record, that is to say in the preference center 53 in the case of the monitoring notification service. Other elements of the mobile communication network 10 are provisioned based on that data, so as to implement the subscriber selected usage monitoring and to provide the appropriate notifications.

For example, the mobile traffic network is provisioned so as to report usage activities to the usage data aggregator 37, and the data aggregator is provisioned to monitor operations of those mobile stations and determine if/when operations of any of the mobile stations through the network 10 begin to approach the account limits. One approach may be to provision the network 21 to treat the mobile stations 13, 15, 17 in a manner similar to those of prepaid subscribers, so as to look to the usage data aggregator 37, before communications, to report usage to the usage data aggregator 37 in real time. In this way, the data aggregator can perform calculations to determine the actual limits for each activity. The usage data aggregator 37 can also monitor the activities of the mobile stations 13, 15, 17 to detect usage, for reporting purposes.

In the illustrated example, when the usage data aggregator 37 detects account usage that approaches a preset threshold level, it generates and sends a notification request message to the customer communication system 41. One approach would be for the usage data aggregator 37 itself to send one or more notifications, but the exemplary approach reduces the workload on the data aggregator 37 and facilitates application of more sophisticate logic or 'business rules' to the notifications regarding various types of usage and what is preferred by the various subscribers. Hence, in the mobile communication network 10, the data aggregator 37 generates a request message for a notification to be sent to the mobile station that the aggregator detected has approached an applicable subscriber selected usage limit, and the usage data aggregator 37 sends that notification request message through the carrier's private network 35 to the customer communication system 41.

The customer communication system 41 receives the notification request message and processes that message to determine where to send one or more notifications regarding the usage. Of note for purposes of the example, this entails a lookup of relevant account information to obtain a destination address of the designated account holder for the subscriber's account. Typically, this will be the mobile station 13 that the subscriber selected. Using that destination address, the customer communication system 41 sends a notification intended for the account holder. In the example, this typically entails sending an SMS message addressed to the designated account holder through the SMPP gateway 34 to the SMSC 33, which stores and forwards the SMS notification message through the mobile traffic network 21 to the account holder's mobile station 13.

Figure 2:
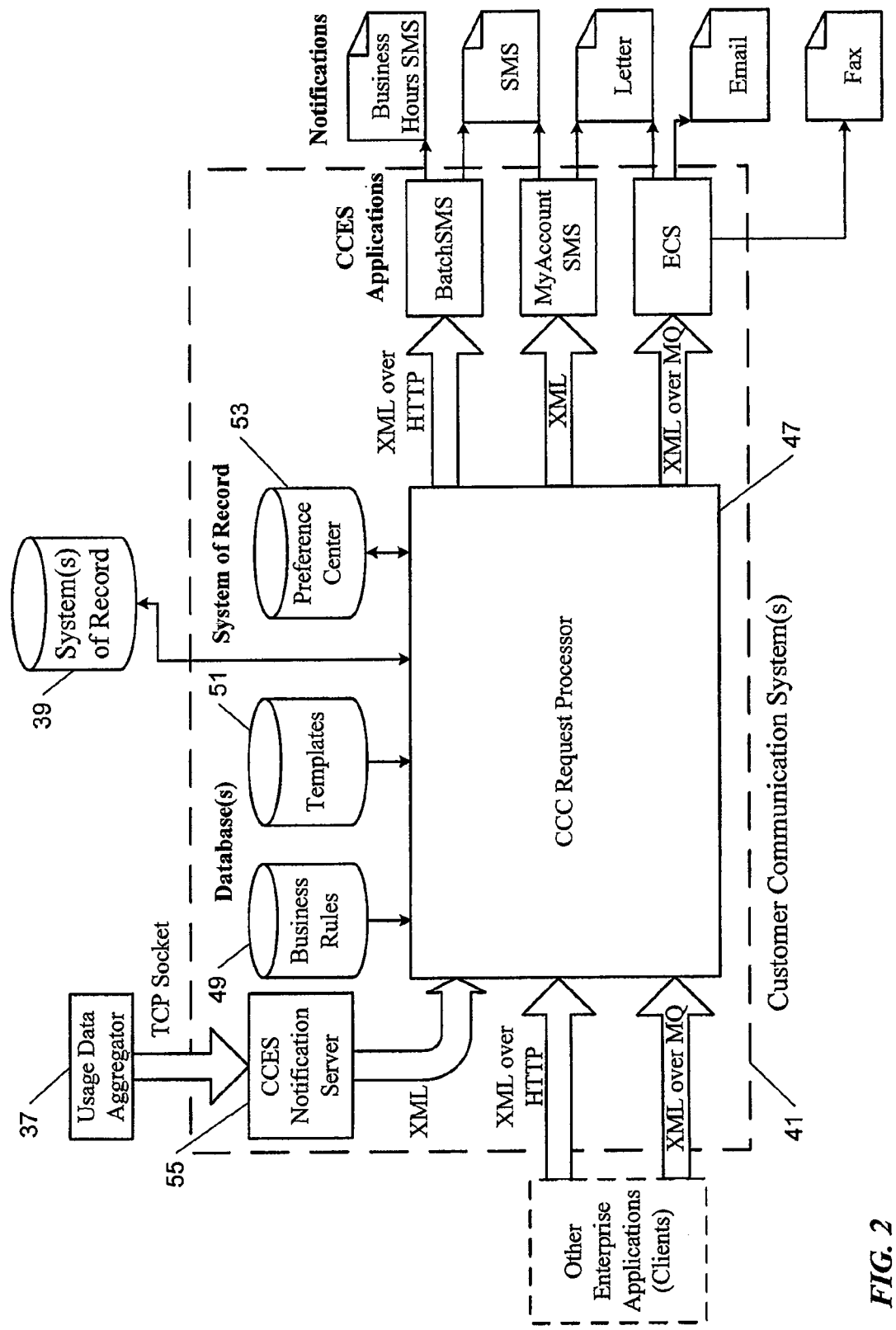
FIG. 2 is a functional block diagram useful in explaining an implementation of a customer communication systems involved in providing notifications to mobile users, including those provided upon occurrences of reaching usage account thresholds.

FIG. 2 depicts software and associated functionalities, in block diagram form, where the software may be run on the hardware of a host or server type computer or system of such computers, to implement the customer communication system 41; and that drawing illustrates several other elements that communicate with that system for providing notifications to mobile users, including those provided upon occurrences of usage limits. For example, the drawing shows the usage data aggregator 37 as well as the systems of record 39 and 53, in this case a Vision type billing system 39 and preference center 53. In the example, the customer communication system is implemented as an enterprise middleware web service written in Java that receives notification requests in the form of XML via HTTP or MQ, and follows business rules to send customer notifications and update systems of record. In general, these communications may utilize pre-existing CCES web services to facilitate the sending of text message, Email, letter, and fax notifications. Hence, the customer communication system 41 may be implemented as middleware, that is to say, in this example, as software for implementing a CCC notification request processor 47, one or more databases 49 and 51, and a directory 53, as will be discussed in more detail below.

Although shown as a common platform at 41 in FIG. 1, the elements of the customer communication system 41 of FIG. 2 may be implemented on separate hardware communicating with each other via a network the same as or similar to network 35. For example, one or more of the databases 49, 51 and 53 typically will be implemented as separate servers in communications with the hardware platform(s) implementing the CCC notification request processor 47, although the databases may be implemented as records and appropriate application software running on the same computer as the middleware for the CCC notification request processor 47. The preference center directory 53, for example, may be implemented as a LDAP server coupled for communication with the computer running the CCC notification request processor 47 programming.

The CCC notification request processor 47 receives notification requests, processes them and provides the processed requests to associated messaging applications that send the desired notifications out via one or more delivery techniques. In the illustrated implementation, the CCC notification request processor 47 provides such notification services for a number of enterprise applications, as well as for usage limit notifications responsive to usage detected via the usage data aggregator 37. For example, the other enterprise applications may trigger notifications of certain activities on a subscriber's account, such as when a customer uses the on-line web service through server 43 to change their address, email address, MyAccount challenge question, MyAccount password, MyAccount secondary email addresses, or Vision password. In any such case, the CCS request processor 47 will send a notification to the customer following specific notification logic and provide fallout files by area when the notification cannot be made.

In the example of FIG. 2, the customer communication system 41 supports notification delivery upon approaching usage limits. Hence, when a mobile station 13, 15, 17 under an account triggers a certain notification to occur, the account holder should also receive a notification. The system 47 will check the system of record to determine at least the e-mail address of the account holder when the web service receives a notification request under the account, and the system sends notifications to the account holder.

Of note, the proposed example of the CCC notification request processor 47 receives notification requests in XML format. A number of business applications or clients deliver such notification requests in XML format. Where the platform functioning as the usage data aggregator 37 for Usage Control service is a SurePay® platform from Alcatel-Lucent, however, that platform cannot send notification requests as XML over Hypertext Transfer Protocol (HTTP) or Message Queuing (MQ), like the other CCES client applications use in the illustrated implementation example. Hence, the system of FIG. 2 includes a TCP/IP socket based interface, in the form of CCES notification server 55, to facilitate the notifications. To the 'client' application of the usage data aggregator 37, this interface appears as a server 55, and this interface will act as a broker between the data aggregator 37 and the CCES notification middleware, particularly the request processor 47. For example, the notification server 55 parses each message from the usage data aggregator 37 to form an XML message appropriate for delivery to the CCS request processor 47. A regular expression based parser may be used to extract each field from the name value pairs contained in each of the notification request messages from the usage data aggregator platform. In the example, these fields are used to construct a CCC XML notification request following the CCC XML schema used as inputs to the CCC request processor 47.

The customer communication system 41 includes or has communication access to a number of databases that store information used in performance of various notification related functions. In the example, the customer communication system 41 includes a database 49 of business rules and a database 51 of notification message templates. The rules in the database 49 provide the logic for determining what notifications to send in response to the various events reported by the usage data aggregator 37 and the other enterprise applications. The template database 51 provides the format and common content, e.g. forms or templates, for the various notification messages sent out by the system 41.

The Preference Center is the system of record for communication preferences and account holder designation. Communications with this systems of record 53 provide the CCS request processor 47 with information that is useful in processing of various notifications. The systems 53 and 41 communicate using XML, via the network 35, to store and retrieve the preference and account holder data from system 53.

Thus, the preference center directory 53 stores preference data regarding notifications for various network customer accounts that may be subject to notifications. For the infraction reporting feature, the preference center directory 53, for example, stores the MDN of the account holder as designated by the subscriber. The directory may store other notification preference information for the subscriber account, for infraction notifications and/or for other notifications that the carrier may want to provide to the subscriber, such as other notification destination addresses, a preferred language for the notification messages (e.g. English or Spanish), etc. The language for the notification also may be specified by a field or parameter of the notification request message, as provisioned in the usage data aggregator with regard to the monitored mobile stations 13, 15, 17. The CCS request processor 47 communicates with the Preference Center application that updates its directory 53 using the Lightweight Directory Access Protocol (LDAP).

The customer communication system 41 also runs one or more message output applications, identified as CCES applications in FIG. 2, for processing the notification request messages output from the CCC notification request processor 47, as needed to generate and send the actual notification messages through one or more communication delivery channels. The CCC notification request processor 47 modifies notification request messages based on its processing and outputs the modified notification request messages in XML format to the appropriate one or more of the CCES applications, to send the actual notifications. The CCES applications comprise application programming software, which may run on the same or a different computer from the CCC notification request processor 47.

The CCES applications enable the customer communication system 41 to provide notifications, including notifications regarding the usage limits and notifications for the other enterprise applications, using a number of communication techniques, as shown by way of example to the right of FIG. 2. Some messages may be batch processed for SMS communications or sent in real time in response to triggering events as represented by the MyAccount SMS processing in the drawing. Batch SMS communications may be limited to business hours if desired or sent at any time of the day. Notifications can be sent in real-time as the infraction events are detected and processed through the customer communication system 41. The customer communication system 41 also supports other types of notifications, such as e-mail, letter, or facsimile transmissions via an Enterprise Communication Services (ECS) function.

At least in an initial deployment, the notifications will typically utilize SMS message transmission to the mobile station of the account holder and/or to the mobile station/that has utilized the account to the limits. Obviously, the notification service could be adapted to offer alternative notification delivery, including HTTP streaming and other methods, either based on a preference or upon failure of SMS message delivery.

The customer communication system 41 could be implemented on a single hardware platform. However, to provide effective notification services for a large number of customers and a large volume of trigger events, the customer communication system 41 for the associated example of usage notification service and other enterprise applications requiring notification may utilize a distributed system architecture. Hence, FIG. 3 is a network diagram of an exemplary hardware platform for the CCES notification service in support of the usage control service.

In the example of FIG. 3, the distributed hardware platform for the CCES Notification Service includes two clusters with DNS with Global Site Selector (GSS) or other load balancing. Each cluster includes two Sun T2000 Servers, configured as CCES Notification Servers (e.g. each hosted at a data center in a different region). There will be a Cisco Content Services Switch (CSS) or other load balancer in each cluster that will balance load to the active nodes in the cluster. Each node will listen on a TCP/IP socket for usage notifications from one or more of the usage data aggregators and on an HTTP port for a CSS keep-alive signal. In the exemplary system architecture of FIG. 3, there can be up to a maximum of 32 simultaneous connections from the data aggregator platform(s) to the CCES usage control notification service. The CCES CCC service connects to the SMPP gateway(s) to deliver the SMS notifications to the customers. In the exemplary system architecture of FIG. 3, there can be up to a maximum of 20 simultaneous connections from the customer communication system to the SMPP gateways. The CCC software will throttle the SMPP messages to avoid reaching the SMPP gateway throttle limits.

The exemplary system architecture can be highly available and fault tolerant. Those skilled in the art will recognize, however, that other system architectures may be used, e.g. to meet the demands of increased event and notification traffic relative to the usage control service and/or other enterprise applications that require customer notifications.

The usage data aggregator platform sends notification requests to the CCES Notification Service servers via TCP/IP sockets. Multiple TCP/IP socket connections can be made to each CCES Notification Server. Each TCP/IP Socket connection will remain open indefinitely and receive and acknowledge notification requests one at a time. If the TCP/IP socket connection to CCES is severed, the usage data aggregator platform needs to reestablish it and resend any notification that was not acknowledged. Acknowledgements from the customer communication system will indicate that each of the messages was received for processing, but does not provide any detail into the success or failure of SMS delivery.

As outlined above, the notification server function provides an application program interface or API between the usage data aggregator and the CCC notification request processor. This API enables an exchange of information between systems using standard TCP/IP Sockets protocol. In an example, there is one process running in the customer communication system that receives messages from data aggregator. This process may be a multi-threaded, socket-based listener. The messages and acknowledgements may be sent in a synchronous fashion. That is, the usage data aggregator waits for an acknowledgement from customer communication system for every message sent before it continues sending more messages. If there is no acknowledgement from the system, then the data aggregator tries to resend the message after a determined/set period of delay.

The CCES software for notification services may be written in Java. Each CCES Notification Server node in the example has an instance of Websphere running the CCES notification software and the CCC/MyAccountSMS software on the same Java Virtual Machine (JVM). This allows the usage control service to utilize all of the features of the customer communication system including: SMS notifications, EMS notifications, MMS notifications, Email notifications, fax notifications, letter notifications, notification templates, rules based failure notifications, preference center lookups, and weekly reports. EMS (Enhanced Messaging Service) is an application-level extension to Short Message Service (SMS) for cellular phones available on GSM, TDMA and CDMA networks. The CCC software, for example, makes the preference center lookups on the account number provided in the notification request to send SMS notifications to the Account Holder.

Figure 4A:
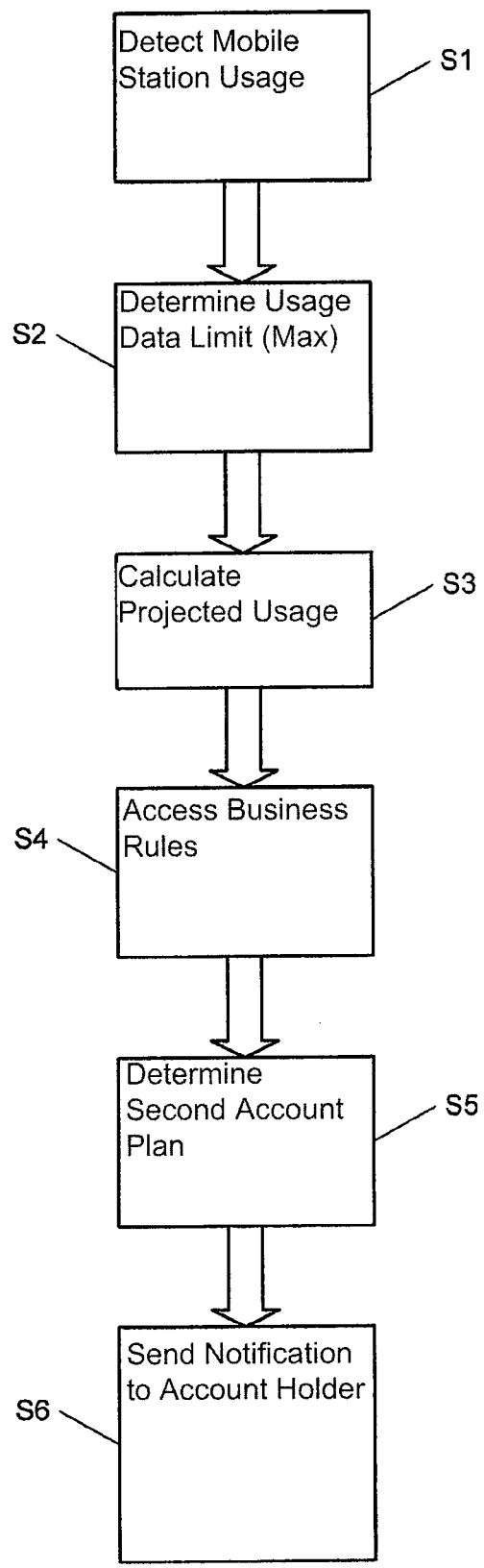
Figure 5:
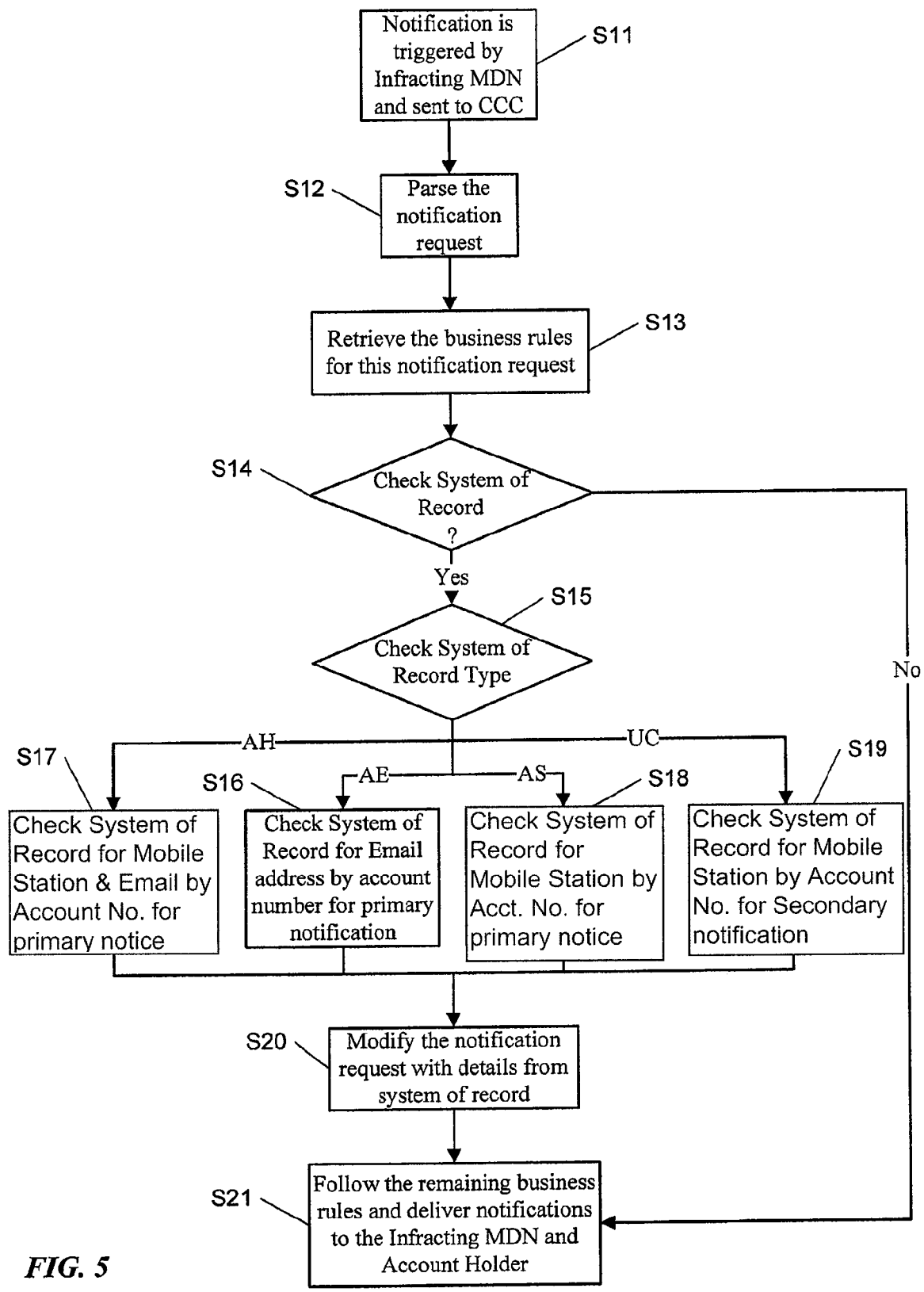
FIG. 5 is a flow chart illustrating a process similar to that of FIG. 4 but showing somewhat more details of exemplary operations for some portions of the notification procedure.

The flow chart of FIGS. 4A and 4B provide high level illustrations of flow for examples of tracking and notification procedures. FIG. 5 shows a somewhat more detailed exemplary procedure. For purposes of the discussion of these processes, we will assume that the subscriber has subscribed or is enrolled in a usage notification service, such as outlined earlier, and under that type of service, has selected monitoring voice call usage per month. The subscriber also has designated mobile station 13 as the 'account holder.'

The monitoring process (FIG. 4A) begins with detecting mobile station usage 13, 15, 17 in real-time, step S1. In the mobile communication network 10 of FIG. 1, the usage data aggregator 37 can monitor all usage, but this example looks only at voice call usage by the mobile stations 13, 15, 17. The usage data aggregator 37 either has, or requests from system 39, the account information regarding the monitored mobile stations 13, 15, 17. From the account information, the usage data aggregator 37 determines the usage data limit, step S2. The usage data limit, in this example, the voice call usage maximum limit, is the amount of airtime (e.g. minutes) the mobile stations 13, 15, 17 are allowed to use per a specific usage time frame. Again, in this example, it is typically a one month time period. Thus, the account can be allocated 1000 minutes per month. Typically, if a subscriber exceeds the amount of allocated minutes within that month (overage), the subscriber is charged a premium for each additional minute.

The usage data aggregator 37 looks at the present usage (i.e. the current number of minutes used) and the present time (e.g. day 20 of a 30 day cycle) and then calculates a projected usage to the end of the specific usage time frame, step S3. So, if the mobile stations 13, 15, 17 have used 800 minutes in 20 days, the calculations can be as follows:

$$\frac{usage}{total} = \% \text{ usage} \rightarrow \frac{800}{1000} = 80\%; \tag{1a}$$

$$\frac{time}{cycle} = \% \text{ time} \rightarrow \frac{20}{30} = 66.6\%; \tag{1b}$$

and $$\text{compare } \% \text{ usage to } \% \text{ time--}80\% > 66.6\% \text{ thus send a notification.} \tag{1c}$$

The above is similar to a "burn rate" calculation to determine, at the moment of usage, that the amount of minutes (or data) are being used faster than the time remaining in the cycle. Stated a different way, based on the total minutes in a plan and the plan cycle, there is an average amount of minutes (or data) that a user should be consuming per day (here, about 33 minutes a day). If the % usage is greater than the % time, then the user's burn rate is faster than an average rate for the remaining usage under the plan for the time remaining in the cycle. This example calculation does not necessarily result in a calculation of a projected usage, which is discussed below. Rather, account upgrades can be tabulated and the % usage and % time number can be cross-referenced in a table or matrix to determine the next subscription account level for this "burn rate."

Figure 6:
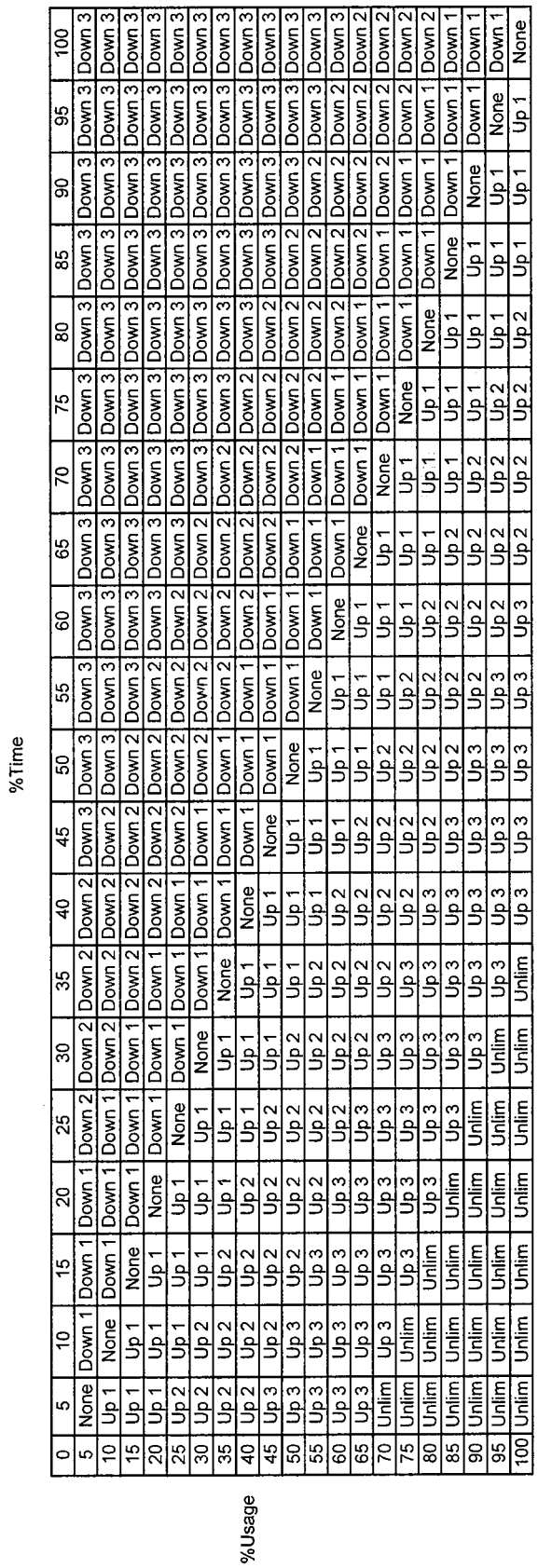
FIG. 6 is an exemplary look-up table for subscription plan changes.

FIG. 6 illustrates an exemplary look-up table. The % usage is compared to % time to see what plan, if any, can be suggested to the user. In the illustrated table, the % usage and the % time are broken up into 5% increments. However, one of ordinary skill can create a table with larger or smaller increments. Additionally, another example can "round-up" or "round-down" the values to enter the table. Using the above calculations, the % time can be rounded up to 70%. The values, increments, "round-up", and steps can all be set globally by the subscription plan provider, or each user can select some or all of the parameters to customize the look-up table for their own account.

Entering the table, the values associated are "None", "Up 1", "Up 2", "Up 3", "Unlim", "Down 1", "Down 2", and "Down 3". "None" is the state where a plan change is not suggested. "Up 1, 2, and 3" is where the system recommends a new plan that is 1, 2, or 3 tiers above the user's current plan, and "Unlim" means to recommend the unlimited plan. Down 1, 2, or 3" is where the system recommends a new plan that is 1, 2, or 3 tiers below the user's current plan, if that option is selected. In the example using the burn rate calculations above and FIG. 6, the system recommends the subscription plan that is one tier above the user's current plan, and this should cover the expected overage.

Alternately, a projected usage can be calculated, as set forth below in equation (2a):

$$\frac{usage}{time} = \frac{projected}{cycle} \rightarrow \frac{800}{20}$$
$$= \frac{projected}{30} \rightarrow 800*30$$
$$= 20 * projected;$$

and $$projected = \frac{800*30}{20} = 1200$$

compare projected usage data limit to maximum usage
data limit: 1200>1000 thus send a notification. (2b)

Once the calculations determine that the projected usage exceeds the usage data limit, the usage data aggregator 37 then either recalls or requests additional business rules surrounding other types of accounts, step S4. Here, the usage data aggregator 37 compares the projected data usage to other usage data limits that are part of other account types. This comparison determines if there is another account type that the user can subscribe to so that the projected data usage would not exceed the usage data limit for the second type of account, step S5.

In this example, the usage data aggregator 37 determines that there is a 1500 minute plan that the user can subscribe to and generates and sends a notification request message with the relevant information to the customer communication system 41, step S6. To complete the example for following through with the notification process, the CCES notification server 55 receives the notification request message, essentially as the trigger for notification to the mobile station. From the overall point of view of the network 10, the usage data aggregator 37 initially detects the projected overage. However, from the point of view of the customer communication system 41, the system 41 detects the projected overage by receiving the notification request message regarding the overage from the usage data aggregator 37.

In addition to the example above, not only minutes, but data volume (i.e. megabytes (MB)), can be tracked in similar ways. An example where the system does not send a notification is as follows. The user has total data volume of 100 MB over a 30 day cycle. The user has consumed 50 MB is 15 days. The burn rate calculations are:

$$\frac{usage}{time} = \frac{projected}{cycle} \rightarrow \frac{50}{15}$$
$$= \frac{projected}{30} \rightarrow 50*30$$
$$= 15 * projected;$$

and $$projected = \frac{50*30}{15} = 100$$

and compare % usage to % time−50%=50% (3c)

thus do not send a notification since the user is consuming his data volume at the standard rate.

Or the projected calculations are (4a):

$$\frac{usage}{total} = \% \; usage \rightarrow \frac{50}{100} = 50\% \quad (3a)$$

$$\frac{time}{cycle} = \% \; time \rightarrow \frac{15}{30} = 50.0\%; \quad (3b)$$

compare projected to usage data limit−100≤100 (4b)

thus the system does not send a notification.

Further to this concept, either subscriber user or the account administrator can set thresholds by which the usage data aggregator 37 determines whether or not to send a notification. The above example illustrates a threshold of the projected value being less than or equal to the usage data limit. However, an increment can be set as a percentage above the usage data limit, and above that the notification is sent. For example, the threshold usage amount is 10% over the current or projected amount. This can allow for times when subscribers are close to the end of the account cycle. In one example, if the subscriber used 95% of the usage data limit in 94% of the time, the system does not need to send a notification. Additionally, the system can be set so account monitoring is suspended for a number of days or hours before the end of the account cycle.

In another example, the types of data being transferred and the bandwidth over which it is being transferred can be monitored by the usage data aggregator 37. This allows the system to recommend tiers of data plans based on the types of data accessed by the mobile station 13, 15, 17. An example of tiered usage is that each MB of data traffic is rated either on the mobile station 13, 15, 17 or in the usage data aggregator 37 on multiple levels. The example below shows 4 tiers of data usage, but there can be any number of tiers based on the volume and quality of the data transfer. Also note that the "tiering" below can be organized in any order, the slowest tier (low bandwidth) can be highest or lowest tier, and the same holds true for the fastest tier (highest bandwidth). The ratings below of the traffic are dependant on the type of content. In this example, the lower the number, the higher the speed of tier. All the numbers below are examples and can be related to any type of content or quality of content.

Tiers:
1—(5 Mbps)—Video
2—(2.5 Mbps)—Music
3—(1 Mbps)—Web
4—(256 Kbps)—Email

Further, the user is currently subscribed to a "Tier 2" data plan. A tier score is then calculated based on the subscriber's usage:

(5) Current Tier score compared to ((tier 1×MB Used)+(tier 2×MB Used)+(tier 3×MB Used)+(tier 4×MB Used)+(tier n×MB Used))/(Total MB used)

Here the subscriber uses 100 MB of tier 1 data, 100 MB of tier 2 data, 50 MB of tier 3 data and 5000 MB of tier 4 data. This adds up to a total of 5250 MB. Now, performing the calculation:

$$((1\times100\text{ MB})+(2\times100\text{ MB})+(3\times50\text{ MB})+(4\times5000\text{ MB}))/(5250)=20450/5250 \text{ in which } 2\le3.895.$$

This illustrates that the user is using a higher tier data service then what they have signed up for. The usage data aggregator 37 can send a notification to the subscriber with the suggestion to change their tier to match level based upon their monthly usage.

In another example, using the same tier structure, the subscriber uses 100 MB of tier 1 data, 5000 MB of tier 2 data, 50 MB of tier 3 data and 200 MB of tier 4 data. This adds up to a total of 5420 MB. Further, this subscriber is on a "Tier 3" plan. When calculated:

$$((1\times100\text{ MB})+(2\times5000\text{ MB})+(3\times50\text{ MB})+(4\times200\text{ MB}))/(5450)=11050/5420 \text{ in which } 3>2.02.$$

This illustrates that the user is using a higher tier data service then what they are subscribed to. At this point usage data aggregator 37 can send a notification to suggest a new tier plan so the mobile station 13, 15, 17 can receive the bandwidth needed for the services the subscriber uses the most. As a further note, when the values are equal there is no reason to upgrade or downgrade.

FIG. 4B illustrates a monitoring and notification process, which, as above, begins with detecting mobile station 13, 15, 17 usage in real-time, step S1. In the mobile communication network 10 of FIG. 1, the usage data aggregator 37 can monitor all usage, but this example looks at the types of data received by the mobile stations 13, 15, 17 (e.g., video, music, text, email, etc.), step S7. The usage data aggregator 37 can determine the tier score based on the calculations above.

The usage data aggregator 37 looks at the present usage, divided into arbitrary and pre-selected tiers, and then divides by the total usage to calculate a tier score, step S8. Once the calculations determine the tier score, the usage data aggregator 37 then either recalls or requests additional business rules surrounding the user current tier, step S9. Here, the usage data aggregator 37 compares the tier score to the current tier and determines if user should subscribe to a second tier of account, step S10. Note that the second tier can be a higher or lower tier. In the above examples, the usage data aggregator 37 determines that the user should switch tiers and generates and sends a notification request message with the relevant information to the customer communication system 41, step S6.

In the examples above, the algorithms can be combined to show both plan upgrade and tier upgrades together but they can also be used independently. While examples are for both single and multiple mobile stations on one account, the algorithms can be used on the primary account holder, any secondary account holder separate from the primary account holder, or an entire company's data usage consumption and patterns.

Other examples include that when a user reaches the threshold data usage the ability to suggest account plan upgrades can have some AI heuristics to solve this problem, especially if there are multiple users on one account. Thus, as noted above, if a user has a 10 GB monthly plan and they use more data than the average daily allowance in a certain billing period the user should get an upgrade notification. If the user consumes 7.5 GB (75% usage) in 15 days (50% of the month), the user receives a threshold notification and an upgrade notification. Alternately, the user consumes 7.5 GB (75% usage) in 23 days (75% of the month), the user may receive a threshold notification but not an upgrade notification.

Returning to the "intelligence" of the system, it must be programmed to understand the multiple plan options, their costs, and the incremental costs of the overage. This allows the system to suggest the correct data plan to the user. If the user has gone well beyond their data usage in a short period of time the system should offer them the highest possible plan.

Some examples are that the same user with the 10 GB plan uses 7.5 GB (75% usage) in 18 days (60% of the month). That user gets a threshold warning and a suggestion to upgrade to the next level data plan. This user now uses 7.5 GB (75% usage) in 8 days (27% of the month), gets a threshold warning, and is suggested to upgrade to the highest level data plan.

Another option is to calculate the projected overage, calculate the overage fees and also compare that to the fee change for the upgrade to the next data plan. Continuing the examples above, if the user consumed 7.5 GB in 18 days, the projected amount at the end of the month is 12.5 GB. The system can then calculate that this is a 2.5 GB overage, and the penalty is $10 a GB, thus the overage charge is $25. However, in comparing that to the next level data plan, which is 15 GB for an extra $30 a month, it is more cost effective for the user to pay the overage fees. However, this does not have to prevent the system from notifying the user. The user may want the extra 2.5 GB of "insurance" the 15 GB plan allows, since if the user consumes 15 GB, the overage is now $50. The system can notify the user of the costs of both the projected overage and the upgraded plan and let the user decide.

Further, to the example of 7.5 GB in 8 days, this projects out to approximately 28 GB consumed at the end of the cycle. So, at $10 a GB, this is an overage of $180 (28 GB–10 GB already in the plan). The user is informed of the 30 GB plan for an extra $60. However, the system can also inform the user of upcoming promotions that also can change the cost structure. There may be a 50 GB plan for an extra $100, but the user gets a free phone upgrade, or the like. The promotions can also be factored in if they are of lower cost but only for a limited time.

This heuristic intelligence, as shown above, can also tell users what data speed tier is the best suited for them, and when given the threshold notification and an upgrade option, the system informs them of the best data speed tier to upgrade to. For example, if the user is mainly (over 60%) using the network for high bandwidth multi media services, such as streaming music and videos, then the user will be suggested to upgrade to the highest data rates. If the user is mainly (over 60%) using the network for low bandwidth services, such as e-mail, they should be suggested to use a lower data plan. If the user has a wide mix of services then a mid-tier or high-tier level of data services may better suite their needs. This can also be combined with the usage analysis above to find the most cost effective plan for the user's need based on the volume consumed analysis above and the bandwidth suggestion. A one tier lower or higher bandwidth plan may solve the consumption issue. However, there may be one factor that drives the suggestion, and then the user is give all options based on both bandwidth and consumption and the notification can have all of this information.

Regardless of why the notification is sent, the CCC notification request processor 47 uses an event identification and/or a notification type identification, from a parsed (now XML) notification request message, to access the business rule database 49, to retrieve one or more applicable business rules. For example, the applicable business rule may indicate that there is be a preference lookup, and if the system supports lookups for different types or sets of subscriber preference information, the business rule may also indicate the appropriate one of several possible types of preference lookup. In the present example, the voice call usage should generate a notification to the account holder. Hence, the business rule specifies a need for a preference lookup and indicates a particular type of preference lookup so as to obtain a destination address of the subscriber designated account holder.

Hence, the CCC notification request processor 47 will do an LDAP lookup to a system of record, that is to say the preference center directory 53 in the implementation of FIG. 2, to obtain the account holder's mobile station 13. The lookup could provide other delivery point destination information, although for this example, we will assume that the lookup identifies only the account holder.

The CCC notification request processor 47 processes the notification request. In this example, the processing entails generation of two SMS messages, one to mobile station 15 that is approaching the overage and another to the account holder's mobile station 13. This typically entails obtaining a template of the appropriate notification message from the database 51 and filling-in appropriate fields of the template with the relevant data, obtained from the notification request message and/or from the system of record lookup in step S4. In step S6, the customer communication system 41 sends the SMS message to the account holder's mobile station 13.

In an exemplary implementation, the usage control example with infraction notifications is configured to provide SMS notifications, addressed to the designated account holder. It is known that notifications can be sent in other ways, for example MMS, HTTP streaming, and voice mail. The customer communication system 41, however, supports a variety of other user or account holder notifications as well as configurations in which notifications are provided to alternate destinations by alternate delivery techniques in the event of initial deliver failure. Although developed for other enterprise applications, such additional or alternate notification techniques could be applied to the usage notifications, as well.

The flow chart of FIG. 5 shows some aspects of exemplary processing by the customer communication system 41 in somewhat more detail. Processing begins at step S11 when there is a trigger of notification regarding the usage of a mobile station account being monitored. The message is parsed at S12 and delivered to the CCC request processor 47.

As discussed above, the notification request message includes the information in respective data fields, including, for example, an indication of the projected overage and suggested second account plan, identification of the account and mobile station 15 that caused the notification. In step S13, the notification request message may also specify a type of notification. Based on information from the parsed (now XML) notification request message, the CCC notification request processor 47 accesses the business rule database 49, to retrieve one or more applicable business rules.

However, for purposes of discussion of FIG. 5, we assume that the customer communication system 41 supports a wider range of message options, for at least some of the enterprise applications that utilize the notification services of the customer communication center. In this scenario, notifications may be sent via text message, email, letter, and fax. Each notification request (after S12) conforms to the CCC XML schema that defines the elements needed to send the notification including the request type. Business rules for each request type are used to control the logic for the notification and can include a preference center check. Hence, each business rule will include a field or parameter specifying whether or not a preference check/lookup is required, and if so, a particular one of the various possible types of preference lookups that the system can perform for notification processing.

At step S14 in the example of FIG. 5, the CCC notification request processor 47 examines the applicable business rule to determine if the notification processing for the received request requires a check of the system of record, that is to say, whether a preference check is needed for processing of the received notification request message. If not, the processing branches from S14 to step S21 at which step the customer communication system 41 sends an SMS message to the mobile station. Of note, notification requests regarding projected overages can pull up a business rule requiring a preference check. At step S14, if the processor determines that a check of the system of record is appropriate, the processing branches from S14 to step S15, in which the CCC notification request processor 47 does an LDAP lookup to the system of record in the preference center directory 53 to obtain the relevant subscriber preference information.

In this example, the preference center directory is a system of record for storage of the customer's notification preference(s) and the designated Account Holder. In the example, the system supports four types of preference checks, to lookup various different types or sets of subscriber preference data, based on the type of lookup specified in the applicable business rule. The processing branches below S15 based on the type of preference lookup specified by the applicable business rule.

As in the earlier example, the preference information stored in the subscriber's account record in the directory 53, at least for usage notifications, includes the mobile station 13 designated as that of the account holder for the account. However, this information may also include other subscriber preference information regarding notifications for use in a number of branchings (among steps S16 to S19) in the process flow, depending on the trigger event, the requested type of notification and thus the type of preference lookup determined from the applicable business rule.

The preference center check is made with a web service call that responds in XML with the details from LDAP. The example of FIG. 5 supports four preference types for different notification procedures, for usage notifications and/or for other notification services supported by the customer communication system 41. The exemplary preference lookups and corresponding notifications are as follows:

AE A Preference Center lookup to determine the Email address of the Account Holder for sending primary notifications using the account number (step S16);

AH A Preference Center lookup to determine the mobile station and Email address of the Account Holder for sending primary notifications using the account number (step S17);

AS A Preference Center lookup to determine the mobile station of the Account Holder for sending primary notifications using the account number (step S18); and UC A Preference Center lookup to determine the mobile station of the Account Holder for sending secondary notifications using the account number (step S19).

After the Preference Center lookup is finished the appropriate notification destinations in the XML are updated with the LDAP details that were received. This may entail a modification at step S20 of the notification request with the details obtained from the applicable preference center lookup (from one of steps S16 to S19).

An aspect of a business rule (or a different rule triggered on delivery failure) may be used to indicate that a request type must also follow hierarchical delivery rules in the event of a failure of one or more of the message transmissions. If the business rule for such fail-over is set to yes, then the Email address in Preference Center check will only be used if it is over 30 days old.

After the notification request XML is modified as needed in step S20, notifications are sent using the details in the modified request at step S21. Notifications are sent to the account holder. Further notifications can be sent based on the failure of a prior notification. For example, if the SMS message transmission to the account holder fails, the system may send an e-mail message to an address of the account holder. Then, if the e-mail transmission fails, there might be a letter or facsimile transmission, and so on. This approach allows the Account Holder to receive notifications associated with their account when those trigger, or receive, various notifications via a series of subscriber selected delivery techniques that increase the likelihood of successful notification delivery to the account holder. Similar failover options may also be provided for the notification communications to the other mobile stations.

In the examples outlined above, usage monitoring is a real-time control feature that offers the account holder the ability to manage their billable usage and recommend changes to plans based on the projected usage of the mobile devices under their account(s). Usage notification features may include: voice-warning limits, messaging limits, and data transport limits. The notification services facilitates all communications in real-time to the customers that provision the usage notification feature.

In our example, usage control is an opt-in service managed by the subscriber or account holder only. Features within the service are also opt-in. A network subscriber is not obligated to have usage notification, and a network subscriber that does have usage controls is not obligated to have or activate all features of the service. Account holders can opt-in to the service via web site access, for example, through MyAccount or the like on the carrier's web site implementation. Configuration of usage settings available through MyAccount enables the subscriber to configure each of their mobile units. Usage control SMS messages to mobile devices, subscribers and/or users may be provided for free and do not debit the message limit set or any price plan text messaging allowance. The designation of the Account Holder may be determined by the customer via the web applications, for example, via MyAccount Access Management if implemented on the carrier's web site.

In another example, illustrated in FIG. 7, the system 10 may comprise access networks operated by a large number of separate and independent service providers or "carriers." For discussion purposes, the drawing shows two such radio access networks (RANs) 40 and 20, which we will assume are operated by two different carriers (VZW and another carrier), although those skilled in the art will recognize that large carriers operate a number of such networks and that many countries have more than two mobile carriers that offer or soon will offer packet data communication services. Through the carriers' access networks 20 and 40, the overall system 10 offers mobile communications to customers using mobile stations throughout a wide geographic area. Physical elements of a radio access network (RAN) 20, operated by one of the other carriers, includes similar features to the system described in FIG. 1, and are similarly identified.

In this example, usage data aggregator 37 performs a variety functions related to controlling usage of packet data communication for the mobile stations. The usage data aggregator 37 stores information of data usage for each mobile station user such as each user's data usage limit set by each user's data plan and thresholds of data for sending notification of usage depletion for each mobile station user. The usage data aggregator 37 can request a threshold data amount assigned to a mobile station be calculated by a Packet Data Serving Node (PDSN) 48, which counts the data usage, upon receiving the request. The PDSN 48 has a connectivity to the outside network 29 via a web server 52 which is a gateway to provide webpages to user's mobile station 17 or PC 15. Further, RAN 40 has a Home Location Register (HLR) 46, which stores data regarding the valid station's identification, the assigned telephone number, subscription service options terminal capabilities, etc.

The PDSN 48 checks a remaining data threshold or amount of data assigned to the mobile station user continuously during a data session, and informs the usage data aggregator 37 that the remaining data threshold has been reached and also sends the exact consumed amount of data. The usage data aggregator 37 updates the counting of data based on availability of more data resources or the change in account limits.

After receiving information of the consumed data from the PDSN 48, depending on whether the threshold amount assigned to the mobile station user has been reached, the usage data aggregator 37 can decide to send a real-time threshold notification to the mobile station 13, 15, 17.

An Enhanced Service Manager (ESM) gateway 50, which is connected to the usage data aggregator 37, provides the mobile station user with an interface via an Application Programming Interface (API) to set options regarding the threshold notifications and monthly usage allowance of each user on his or her own. For example, the interface may be provided in a form of application interface implemented by a software stored in the mobile station to the mobile station or webpages in which the mobile station user inputs his or her own conditions for sending threshold notifications. The ESM gateway 50 communicates with the usage data aggregator 37, by which the usage data aggregator 37 receives the user's input on the conditions for sending threshold notifications.

The Customer Communication Enterprise Service (CCES) server 55 connected to the usage data aggregator 37 sends the threshold notifications to the mobile station 17 under control of the usage data aggregator 37. The notifications may take form of Short Message Service (SMS) messages, Multimedia Messaging Service (MMS) messages, voice messages or the like as long as the user can be informed of reaching the threshold by the notifications.

In the illustrated example, servers such as 37, 55, 290, 390, and 490 are intended to represent a general class of data processing device commonly used to run "server" programming. Each such device typically runs a general server type program and one or more application programs on top of the server programming, to implement the respective functionality. Such a device typically utilizes general purpose computer hardware to perform its respective server processing and to perform the attendant communications via the network(s). Each such server for example includes a data communication interface for packet data communication. The server also includes a central processing unit (CPU), in the form of one or more processors, for executing program instructions. The server platform also includes program storage and data storage for various data files to be processed and/or communicated by the server. The hardware elements operating systems and programming languages of such servers are conventional in nature, and it is presumed that those skilled in the art are adequately familiar therewith.

When a subscriber establishes an account with the carrier for packet data service, appropriate provisioning is made at an Authentication, Authorization and Accounting (AAA) server 490 (290) and in the usage data aggregator 37 to allow the subscriber to receive data packet communication service. The AAA server 490 (290) also performs a variety of accounting functions, including starting an accounting record, maintaining an interim accounting record, and stopping an accounting record, for each packet data communication service session in response to various messages from the PDSN(s) processing the data session The AAA server 490 acts as a proxy for the user's RADIUS (Remote Authentication Dial-User Service) messages, except accounting messages. The AAA server 490 proxies the RADIUS messages to the provisioned usage data aggregator 37. The AAA server 490 adds relevant information (e.g., MIP attributes) to the received RADIUS messages from the usage data aggregator 37.

When the subscriber initiates a data communication session, the AAA server 490 proxies the RADIUS Access-Request to the usage data aggregator 37. The usage data aggregator 37 checks the user's balance.

Another example sends two notifications at two levels of data consumed in the data plan limit. The number of notifications and the levels of data consumed, at which the notifications are sent to the mobile station, may vary.

The mobile station 17 initiates sending a request for a data session tracked by the PDSN 48. The request includes the mobile station user's Identification (ID) and password. After receiving the data session request from the PDSN 48, the PDSN 48 sends a Request message, which requests account information and includes the mobile station user's ID and password, to the AAA server 490. The AAA server 490 returns the account information based on the mobile station user's ID and password by referring to mobile stations users' profile stored therein. The AAA server 490 forwards the information to the usage data aggregator 37, and checks whether the mobile station user has reached a threshold limit.

The usage data aggregator 37 stores each user's data plan, remaining data quota or amount of data and specified data thresholds at which the user wants to receive notifications. The data thresholds may be pre-set by the user via the ESM server 51. These thresholds can be at certain percentages above the account as a whole, or based on a single mobile station 17. The thresholds can also be below a critical number, if the user so desires, thus the user can be notified if the account is at 50% capacity but the user has only consumed 40%, etc. The usage data aggregator 37 retrieves user's account including information on user's data usage balance reflecting an amount of data usage remaining under the data plan and user's specified data thresholds at which the threshold notification will be sent to the mobile station, and checks if data usage corresponding to the requested data crosses the threshold level of data.

If the data usage crosses the notification threshold level of data, the usage data aggregator 37 sends a notification. If the data usage does not cross the threshold level of data, the usage data aggregator 37 does not send a notification and continues to monitor the mobile station 17.

The usage data aggregator 37 or the PDSN 48 monitors the data requested by the mobile station 17, e.g. music download website, news website, etc. During the data session, the PDSN 48 keeps counting traffic flow of the data session. When the amount of data consumed reaches the data threshold, the PDSN 48 returns to update the usage data aggregator 37 with the consumed data. At this time, the usage data aggregator 37 checks if the last update of the consumed data reaches a first data threshold, e.g. 4.0 GB for 5.0 GB data plan in day 24 of a 30 day cycle. The first data threshold is less than the maximum user data plan limit and is set by the user. On confirming that the notification threshold is reached, the usage data aggregator 37 request the CCES 51 to send a notification of reaching the first threshold to the mobile station 17. In the meantime, the usage data aggregator 37 can still request that the data session be monitored. The CCES 51 sends the notification of reaching the first threshold to the mobile station 17 as requested by the usage data aggregator 37. The notification may take a form of a SMS, a MMS, a voice message, or the like.

The PDSN 49 continues to count the traffic flow of the ongoing data session and alerts the usage data aggregator 37 of reaching a second data threshold, e.g. 4.5 GB in day 24 when the amount of the data consumed reaches a second threshold. The second threshold is less than the maximum data plan limit, and set by the user. Upon receiving the notification, the usage data aggregator 37 request the CCES 51 to send another notification of reaching the second threshold to the mobile station 17. In the meantime, the usage data aggregator 37 may or may not continue to monitor the mobile station 17. The CCES 51 sends the notification of reaching the second threshold to the mobile station 17 as requested by the usage data aggregator 37.

As the PDSN 48 and the usage data aggregator 37 continue to monitor the total data consumed, if the data consumed reaches the maximum data plan limit, e.g. 5 GB, the PDSN 48 alerts the usage data aggregator 37 of reaching the data plan limit. Upon reaching of the data plan limit, the usage data aggregator 37 request the CCES 51 to send another notification of reaching the data plan limit to the mobile station 17. The CCES 51 sends the notification of reaching the data plan limit to the mobile station 17 as requested by the usage data aggregator 37.

Figure 8:
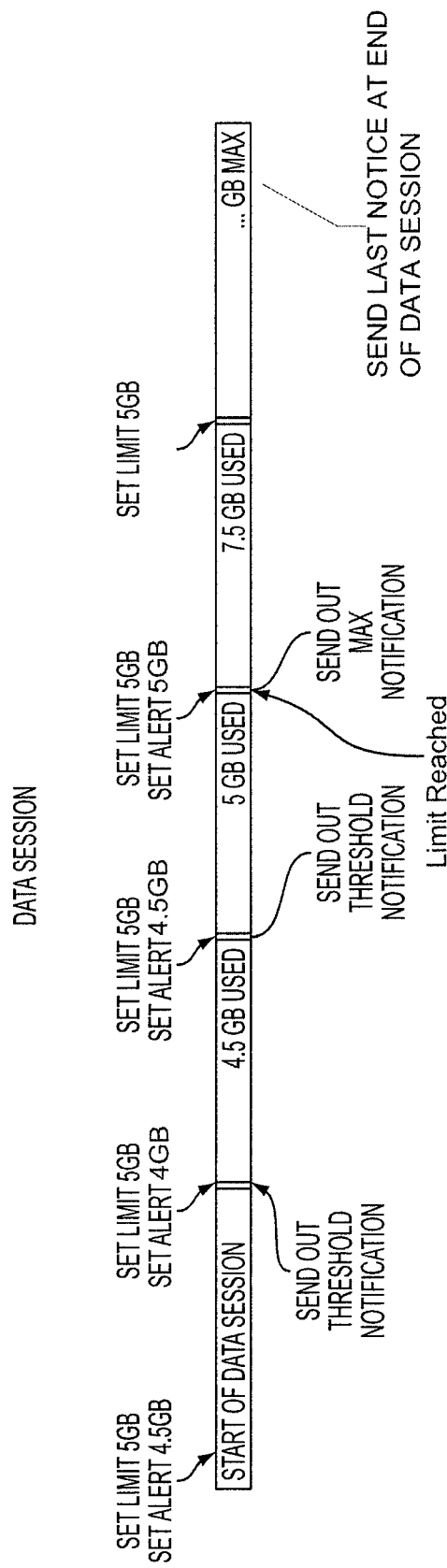
FIG. 8 illustrates an example which sends multiple threshold notifications in real time to a mobile station during a long data communication session.

FIG. 8 illustrates an example which sends multiple threshold notifications in real time to a mobile station during a long data communication session. In the illustrated example, data usage limit is set as 5 GB, and the mobile station user sets three threshold levels of data, 4 GB, 4.5 GB and 5 GB respectively, at which the threshold notifications are sent to the mobile station. The threshold levels of data can be set as the user wants via the ESM server 50, which allows the user to manage data usage within his or her data plan limit effectively. A long data session starts before the three threshold levels and will continue beyond the data usage limit, 5 GB. During the long data session, the PDSN 48 counts the traffic flow from the PDSN 48 to the mobile station 17 and checks if the data usage reaches the threshold levels. When the data usage reaches the first, second and third threshold levels, 4 GB, 4.5 GB, 5 GB, respectively, the threshold notifications are sent to the mobile station 17, without interruption of the data session. Since the notifications are sent to the mobile station even during the data session, the mobile station user can know reaching of or closing in on the pre-set data plan limit in real time. Once the user exceeds the 5 GB limit, and no other threshold limits have been set, the user then receives one more notification at the end of the data session.

The notifications, as noted above, do not typically result in the termination of the user account, and thus the user can continue to operate the mobile station without interruption of service, even once the thresholds and plan limits have been exceeded. Alternately, the user can select an option where the service to one or more of the mobile stations 13, 15, 17 can be suspended once certain thresholds or the plan limit is reached. Here, the user can suspend her own account as to not incur overages or have to change plans. Further, the plan service only to one of the mobile stations on the account can be affected.

As known in the data processing and communications arts, a general-purpose computer typically comprises a central processing unit (CPU) or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the business rules, template and preference center databases. The software code is executable by the general-purpose computer that functions as the usage data aggregator and/or the server(s) forming the customer communication system. In operation, the respective code is stored within the particular general-purpose computer platform. At other times, however, the software may be stored at other locations and/or transported for loading into the appropriate computer platform. Execution of such code by a processor of the computer platform enables the platform to implement the respective processing steps of the infraction detection and notification methodology, in essentially the manner performed in the implementations discussed and illustrated herein.

Figures 9, 10:
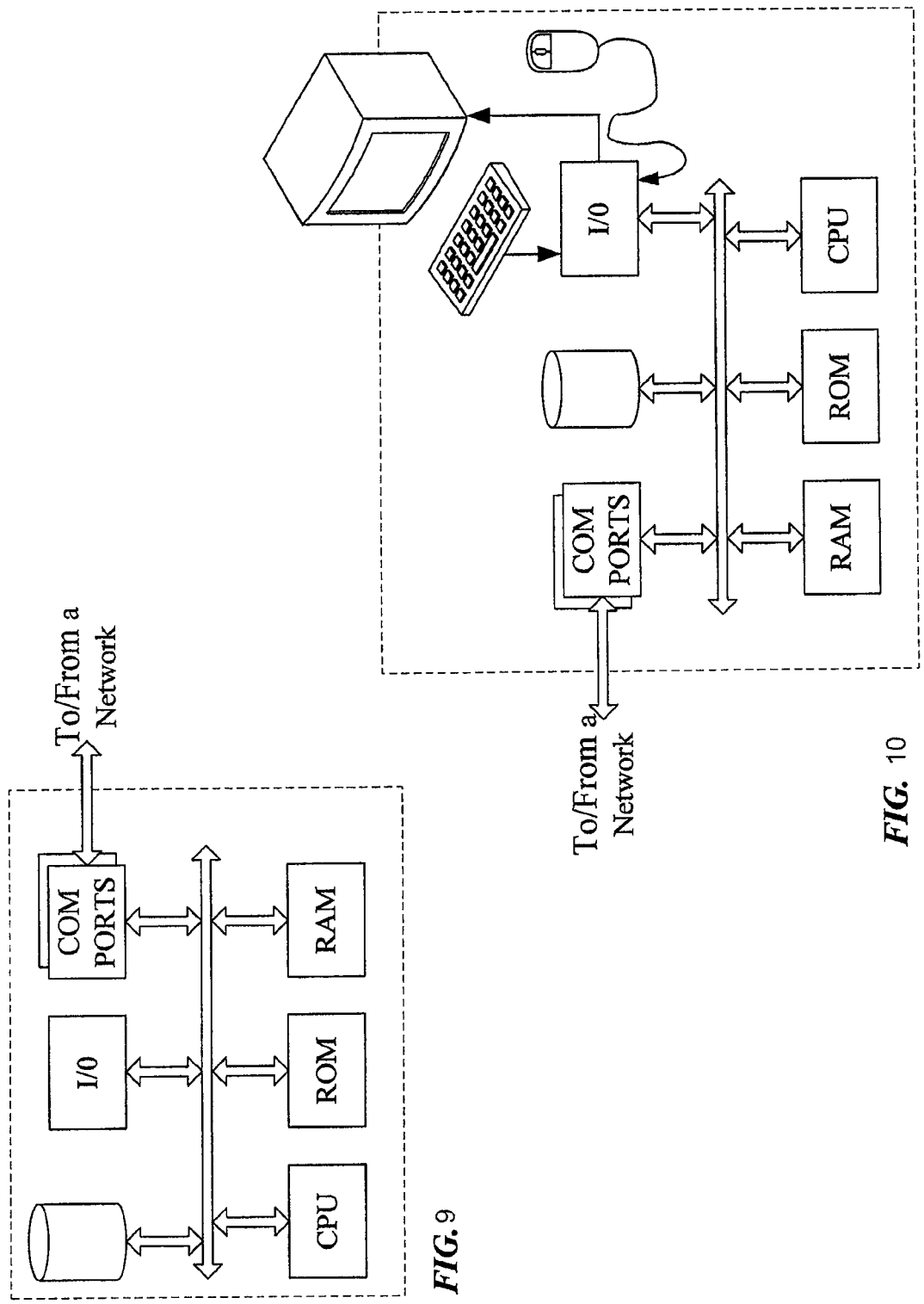
FIG. 9 is a simplified functional block diagram of a computer that may be configured as a host or server.
FIG. 10 is a simplified functional block diagram of a personal computer or other work station or terminal device.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer (PC) or other type of work station or terminal device, although the computer of FIG. 10 may also act as a server if appropriately programmed. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load (as illustrated by way of example in FIG. 3).

Hence, aspects of the methods of providing notifications of mobile station usage outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator or carrier into the computer platform of the data aggregator and/or the computer platform(s) that serve as the customer communication system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementations described above utilized SMS type messages as the initial notification messages to the party that committed the infraction and to the account holder, other electronic messages to their mobile stations may be used for those notifications, such as MMS type messages.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising the steps of:
    tracking, on at least one of a mobile station and a server communicating with the mobile station, an amount of communication usage through a mobile communication network by the mobile station;
    determining, from an account for the mobile station stored on the server, a first communication usage limit and a communication usage time frame;
    calculating, on the server, a projected communication usage amount based on the amount of communication usage, an elapsed or remaining time in the communication usage time frame, and a length of the communication usage time frame;

determining, based on a result of the calculating step, whether the projected communication usage amount exceeds the first communication usage limit;

upon determining that the projected communication usage amount exceeds the first communication usage limit in the communication usage time frame, analyzing at least a second communication usage limit different from the first communication usage limit to determine whether the second communication usage limit is greater than the projected communication usage amount; and upon determining that second communication usage limit is greater than the projected communication usage amount, providing a notification message to the mobile station with a suggestion to change to a subscription plan offering the second communication usage limit.

2. The method of claim 1, further comprising the steps of:
tracking a first data communication type to determine an amount of data communication usage through the mobile communication network of the first data communication type;
determining, from the account, a first bandwidth limit;
calculating, based on the amount of data communication usage of the first data communication type and the communication usage time frame, a projected operational bandwidth;
comparing the projected operational bandwidth to the first bandwidth limit;
upon determining that the projected operational bandwidth is greater than the first bandwidth limit, analyzing at least a second bandwidth limit to determine whether the second bandwidth limit is greater than the projected operational bandwidth; and
providing a message to the mobile station with a suggestion to change to a subscription plan offering the second bandwidth limit.

3. The method of claim 1, wherein the providing step comprises the step of providing a result of the determining step in the message.

4. The method of claim 1, further comprising the steps of:
tracking a first data communication type to determine an amount of data communication usage through the mobile communication network of the first data communication type;
determining, from the account, a first bandwidth limit;
calculating, based on the amount of data communication usage of the first data communication type and the communication usage time frame, a projected operational bandwidth;
comparing the projected operational bandwidth to the first bandwidth limit;
upon determining that the projected operational bandwidth is less than the first bandwidth limit, analyzing at least a third bandwidth limit to determine whether the third bandwidth limit is greater than the projected operational bandwidth and less than the first bandwidth limit; and
upon determining that the third bandwidth limit is greater than the projected operational bandwidth and less than the first bandwidth limit, providing a message to the mobile station with a suggestion to change to a subscription plan offering the third bandwidth limit.

5. The method of claim 1, further comprising the step of:
altering at least one of the amount of communication usage and the projected communication usage amount by a threshold amount before determining whether the projected communication usage amount exceeds the first communication usage limit.

6. The method of claim 1, wherein the mobile station maintains an ability to operate uninterrupted in a communication network.

7. The method of claim 1, wherein the communication usage is packet data communication through the mobile communication network, and the amount of communication usage is tracked in units of data volume.

8. The method of claim 1, wherein the communication usage is voice call communication through the mobile communication network, and the amount of communication usage is tracked in units of time.

9. A method comprising the steps of:
detecting, by a usage data aggregator, a real-time communication usage of communication resources of a mobile communication network by a mobile station and a present time;
accessing account data for the mobile station;
determining, from the account data, a usage limit and an account cycle;
calculating a first ratio of the real-time communication usage to the usage limit, and a second ratio of a time elapsed in a current account cycle to the length of the account cycle;
comparing the first ratio and the second ratio and determining whether the first ratio exceeds the second ratio;
upon determining that the first ratio does not exceed the second ratio, analyzing at least a second account data having a second usage limit to determine whether a third ratio of the real-time communication usage to the second usage limit is greater than the second ratio; and
upon determining from the analysis that the third ratio is greater than the second ratio, providing a message to the mobile station with a suggestion to change to a subscription plan offering the second account data.

10. An article of manufacture, comprising:
at least one non-transitory machine readable storage medium; and
programming instructions embodied in said at least one medium for execution by one or more computers, wherein the programming configures said one or more computers to be capable of performing functions for communicating a threshold notification and account suggestion over a network to a mobile station, the functions comprising functions to:
track, on at least one of the mobile station and a server communicating with the mobile station, an amount of communication usage through a mobile communication network by the mobile station;
determine, from an account for the mobile station stored on the server, a first communication usage limit and a communication usage time frame;
calculate, on the server, a projected communication usage amount based on the amount of communication usage, an elapsed or remaining time in the communication usage time frame, and a length of the communication usage time frame;
determine, based on a result of the calculating step, whether the projected communication usage amount exceeds the first communication usage limit;
upon determining that the projected communication usage amount exceeds the first communication usage limit in the communication usage time frame, analyze at least a second communication usage limit different from the first communication usage limit to determine whether the second communication usage limit is greater than the projected communication usage amount; and upon determining that second communication usage limit is greater than the projected communication usage amount, provide a notification message to the mobile station with a suggestion to change to a subscription plan offering the second communication usage limit.

11. The article of claim 10, wherein the functions performed upon the execution of the programming further comprise functions to:

track a first data communication type to determine an amount of data communication usage through the mobile communication network of the first data communication type;

determine, from the account, a first bandwidth limit;

calculate, based on the amount of data communication usage of the first data communication type and the communication usage time frame, a projected operational bandwidth;

compare the projected operational bandwidth to the first bandwidth limit;

upon determining that the projected operational bandwidth is greater than the first bandwidth limit, analyze at least a second bandwidth limit to determine whether the second bandwidth limit is greater than the projected operational bandwidth; and provide a notification message to the mobile station with a suggestion to change to a subscription plan offering the second bandwidth limit.

12. The article of claim 10, wherein the function to provide comprises the function of providing a result of the determining function in the message.

13. The article of claim 10, wherein the functions performed upon the execution of the programming further comprise functions to:

track a first data communication type to determine an amount of data communication usage through the mobile communication network of the first data communication type;

determine, from the account, a first bandwidth limit;

calculate, based on the amount of data communication usage of the first data communication type and the communication usage time frame, a projected operational bandwidth;

compare the projected operational bandwidth to the first bandwidth limit;

upon determining that the projected operational bandwidth is less than the first bandwidth limit, the programming comprises the function to analyze at least a third bandwidth limit to determine whether the third bandwidth limit is greater than the projected operational bandwidth and less than the first bandwidth limit; and upon determining that the third bandwidth limit is greater than the projected operational bandwidth and less than the first bandwidth limit, the programming comprises the function to provide a message to the mobile station with a suggestion to change to a subscription plan offering the third bandwidth limit.

14. The article of claim 10, wherein the functions performed upon the execution of the programming further comprise a function to:

alter at least one of the amount of communication usage and the projected communication usage amount by a threshold amount before determining whether the projected communication usage amount exceeds the first communication usage limit.

15. The article of claim 10, wherein the mobile station maintains an ability to operate uninterrupted in a communication network.

16. A method comprising the steps of:

tracking, on at least one of the mobile station and a server communicating with the mobile station, a first data type to determine an amount of communication usage of the first data type by the mobile station through a mobile communication network;

determining, from an account for the mobile station stored on the server, a first bandwidth limit and a time frame;

calculating, based on the amount of communication usage of the first data type and an amount of time remaining in the time frame, a projected operational bandwidth;

comparing, on the server, the projected operational bandwidth to the first bandwidth limit;

upon determining that the projected operational bandwidth is greater than the first bandwidth limit, analyzing at least a second bandwidth limit different from the first bandwidth limit to determine whether the second bandwidth limit is greater than the projected operational bandwidth; and providing a message to the mobile station with a suggestion to change to a subscription plan offering the second bandwidth limit.

17. The method of claim 16, upon determining that the projected operational bandwidth is less than the first bandwidth limit, analyzing at least a third bandwidth limit to determine whether the third bandwidth limit is greater than the projected operational bandwidth and less than the first bandwidth limit; and upon determining that the third bandwidth limit is greater than the projected operational bandwidth and less than the first bandwidth limit, providing a message to the mobile station with a suggestion to change to a subscription plan offering the third bandwidth limit.

18. The method of claim 16, wherein:

the tracking step further tracks a second data type and an amount of communication usage of the second data type; and the calculating step calculates the projected operational bandwidth based on the amount of communication usage of the first data type, and the amount of communication usage of the second data type, and the amount of time remaining in the time frame.

19. An article of manufacture, comprising:

at least one non-transitory machine readable storage medium; and programming instructions embodied in said at least one medium for execution by one or more computers, wherein the programming configures said one or more computers to be capable of performing functions for communicating a threshold notification and account suggestion over a network to a mobile station, the functions comprising functions to:

track, on at least one of the mobile station and a server communicating with the mobile station, a first data type to determine an amount of communication usage of the first data type by the mobile station through a mobile communication network;

determine, from an account for the mobile station stored on the server, a first bandwidth limit and a time frame;

calculate, based on the amount of communication usage of the first data type and an amount of time remaining in the time frame, a projected operational bandwidth;

compare, on the server, the projected operational bandwidth to the first bandwidth limit;

upon determining that the projected operational bandwidth is greater than the first bandwidth limit, analyze at least a second bandwidth limit different from the first bandwidth limit to determine whether the second bandwidth limit is greater than the projected operational bandwidth; and provide a message to the mobile station with a suggestion to change to a subscription plan offering the second bandwidth limit.

\* \* \* \* \*